United States Patent
Brinks et al.

(10) Patent No.: US 12,359,011 B2
(45) Date of Patent: Jul. 15, 2025

(54) ELECTROCHROMIC BLOCK COPOLYMERS AND DEVICES MADE WITH SUCH COPOLYMERS

(71) Applicant: Gentex Corporation, Zeeland, MI (US)

(72) Inventors: Marcus A. Brinks, Grand Rapids, MI (US); Joshua P. McClure, Jenison, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 18/769,991

(22) Filed: Jul. 11, 2024

(65) Prior Publication Data

US 2024/0368330 A1 Nov. 7, 2024

Related U.S. Application Data

(62) Division of application No. 18/110,225, filed on Feb. 15, 2023, now Pat. No. 12,071,501.

(60) Provisional application No. 63/310,739, filed on Feb. 16, 2022.

(51) Int. Cl.
*C08F 293/00* (2006.01)

(52) U.S. Cl.
CPC ........ *C08F 293/00* (2013.01); *C08F 2810/40* (2013.01)

(58) Field of Classification Search
CPC ............................ C08F 293/00; C08F 2810/40
See application file for complete search history.

(56) References Cited

U.S. PATENT DOCUMENTS

| | | | |
|---|---|---|---|
| 4,902,108 A | 2/1990 | Byker | |
| 5,998,617 A | 12/1999 | Srinivasa et al. | |
| 6,020,987 A | 2/2000 | Baumann et al. | |
| 6,188,505 B1 | 2/2001 | Lomprey et al. | |
| 6,710,906 B2 | 3/2004 | Guarr et al. | |
| 9,964,828 B2 | 5/2018 | Theiste et al. | |
| 2011/0288253 A1* | 11/2011 | Reynolds | C08G 61/122 526/240 |
| 2015/0094436 A1* | 4/2015 | Kawai | C08G 61/124 526/240 |
| 2016/0244553 A1 | 8/2016 | Reynolds et al. | |
| 2020/0123313 A1* | 4/2020 | Mei | G02F 1/155 |

FOREIGN PATENT DOCUMENTS

| | | |
|---|---|---|
| CN | 113406840 A | 9/2021 |
| WO | 2011003076 A2 | 1/2011 |

* cited by examiner

*Primary Examiner* — Robert D Harlan
(74) *Attorney, Agent, or Firm* — Price Heneveld LLP; Brian James Brewer

(57) ABSTRACT

A medium for an electro-optic element includes a first block copolymer unit including at least one of a first di-block copolymer and first tri-block copolymer and at least one of a donor compound or an acceptor compound conjugated with the at least one of the first di-block copolymer and first tri-block copolymer, thereby forming the first block copolymer unit. The medium further includes a second block copolymer unit including at least one of a second di-block copolymer and second tri-block copolymer conjugated with the at least one of the donor compound and the acceptor compound, thereby linking the first block copolymer unit with the second block copolymer unit.

20 Claims, 20 Drawing Sheets

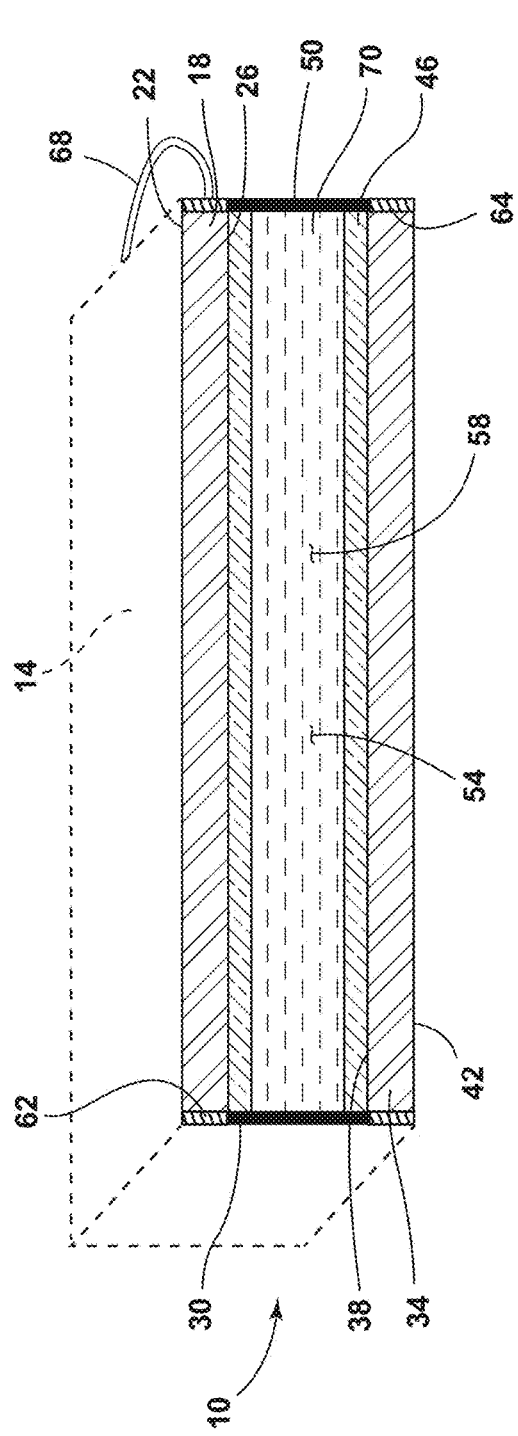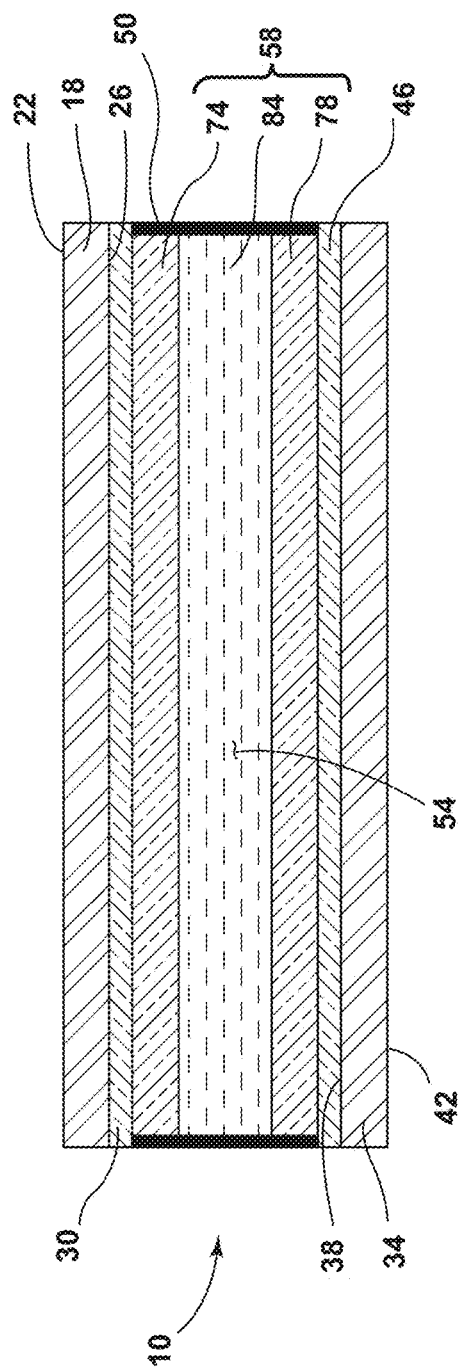
FIG. 1A
FIG. 1B

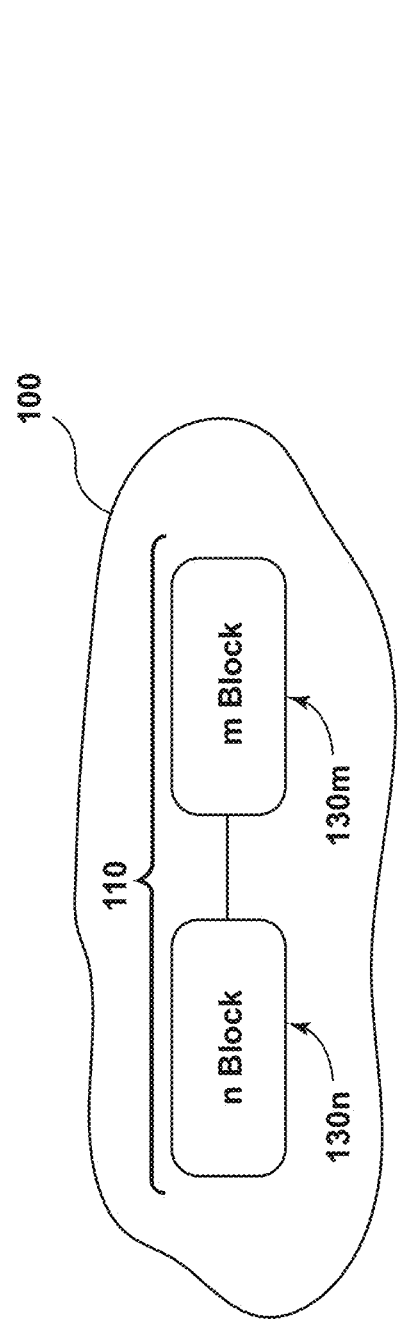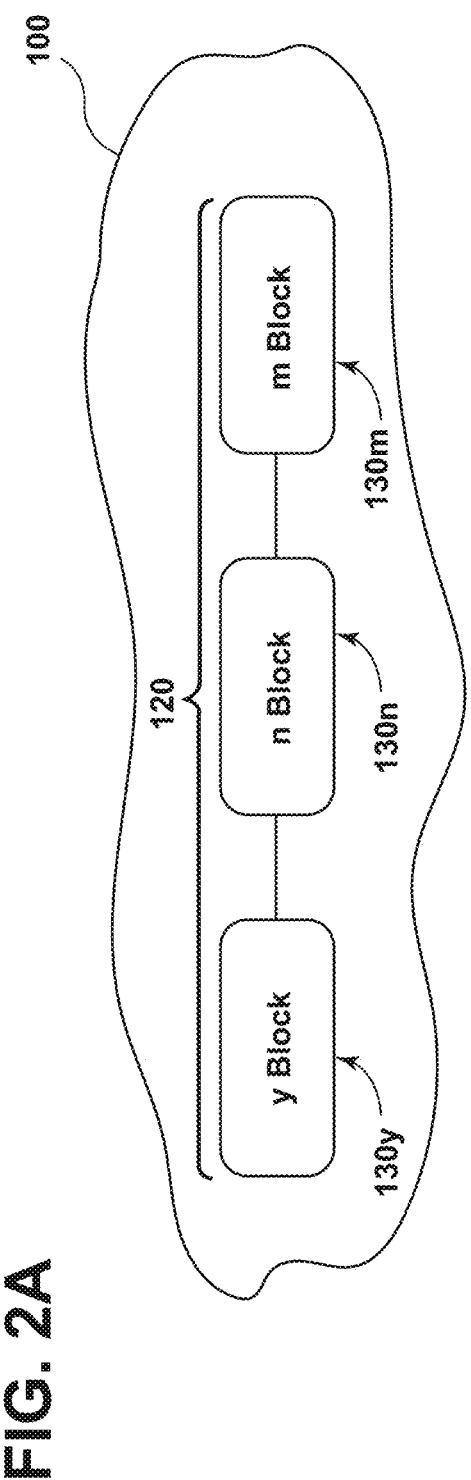
FIG. 2A
FIG. 2B

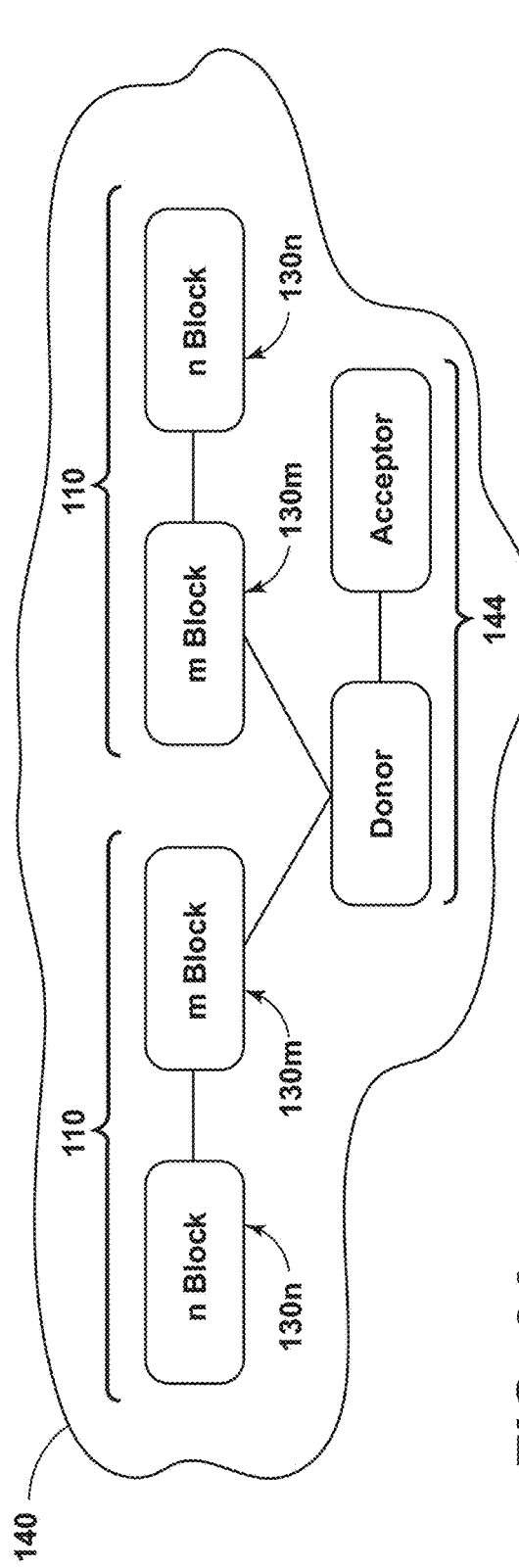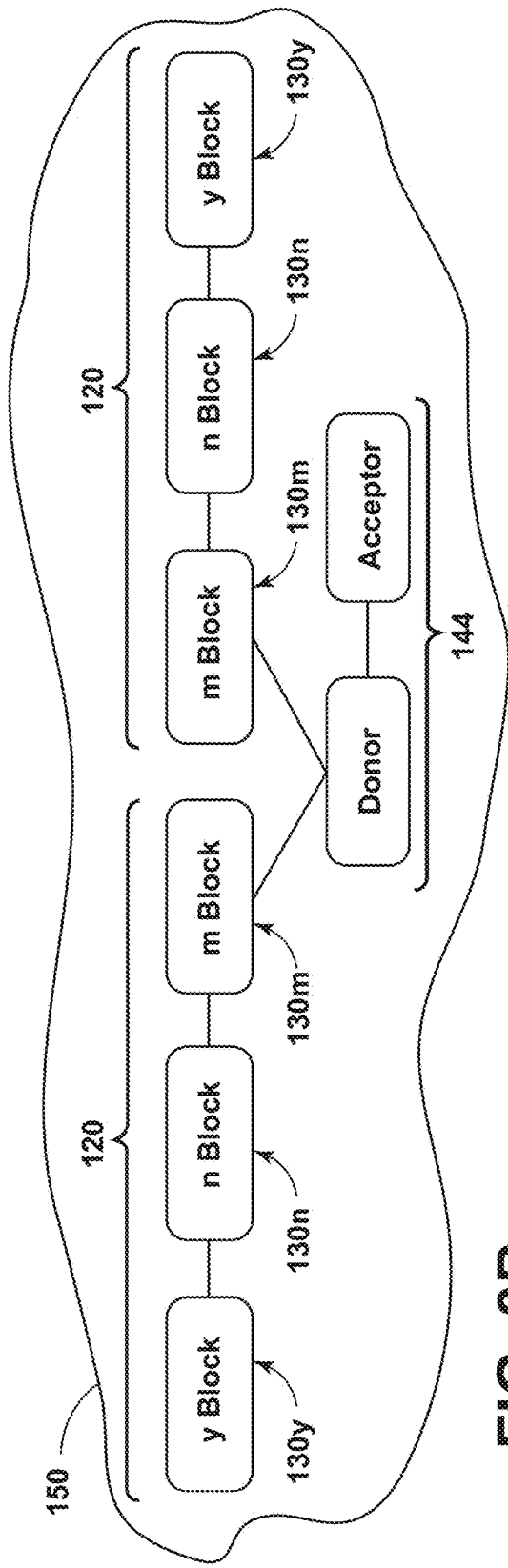
FIG. 3A
FIG. 3B

ELECTROCHROMIC BLOCK COPOLYMERS AND DEVICES MADE WITH SUCH COPOLYMERS

CROSS-REFERENCE TO RELATED APPLICATION

The present application is a divisional of U.S. patent application Ser. No. 18/110,225, filed on Feb. 15, 2023, entitled ELECTROCHROMIC BLOCK COPOLYMERS AND DEVICES MADE WITH SUCH COPOLYMERS, which claims priority to and the benefit under 35 U.S.C. § 119 (e) of U.S. Provisional Patent Application No. 63/310,739, filed on Feb. 16, 2022, entitled "ELECTROCHROMIC BLOCK COPOLYMERS AND DEVICES MADE WITH SUCH COPOLYMERS," the disclosure of which is hereby incorporated herein by reference in its entirety.

TECHNOLOGICAL FIELD

The present disclosure generally relates to conductive polymers and, more particularly, to block copolymers for electro-optic elements and mediums.

SUMMARY OF THE INVENTION

In one aspect of the present disclosure, a medium for an electro-optic element includes a first electrochromic block copolymer unit includes (i) at least one selected from the group of a first di-block copolymer and first tri-block copolymer and (ii) at least one of a first donor compound or a first acceptor compound conjugated with the at least one of the first di-block copolymer and first tri-block copolymer, where the at least one of the first donor compound and the first acceptor compound is electrochromic, thereby forming the first electrochromic block copolymer unit. The medium further includes a second electrochromic block copolymer unit that includes at least one selected from the group of a second di-block copolymer and second tri-block copolymer, wherein the first electrochromic block copolymer unit is polymerized with the second electrochromic block copolymer unit, thereby forming a repeating polymer.

In another aspect of the present disclosure, an electro-optic element includes a first substrate that defines first and second surfaces, where a first electrically conductive layer is disposed on the second surface and a second substrate defines third and fourth surfaces, where a second electrically conductive layer is disposed on the third surface. A medium is disposed between the second and third surfaces. The medium includes a first block copolymer unit that includes (i) at least one selected from the group of a first di-block copolymer and first tri-block copolymer and (ii) at least one of a donor compound or an acceptor compound conjugated with the at least one of the first di-block copolymer and first tri-block copolymer, thereby forming the first block copolymer unit. The medium further includes a second block copolymer unit that includes at least one selected from the group of a second di-block copolymer and second tri-block copolymer, wherein the first electrochromic block copolymer unit is polymerized with the second electrochromic block copolymer unit via the at least one of the donor compound or the acceptor compound.

In yet another aspect of the present disclosure, a medium for an electro-optic element includes a chemical compound of Formula (I):

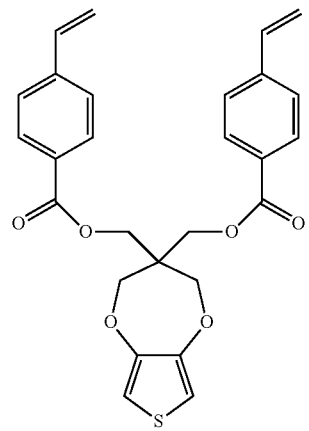

These and other features, advantages, and objects of the present device will be further understood and appreciated by those skilled in the art upon studying the following specification, claims, and appended drawings.

BRIEF DESCRIPTION OF THE DRAWINGS

The invention will now be described with reference to the following drawings, in which:

FIG. 1A illustrates a cross-sectional schematic view of an electro-optic element according to aspects of the present disclosure;

FIG. 1B illustrates a cross-sectional schematic view of an electro-optic element according to aspects of the present disclosure;

FIG. 2A illustrates a schematic of the chemical structure of an exemplary di-block compound according to an aspect of the present disclosure;

FIG. 2B illustrates a schematic of the chemical structure of an exemplary tri-block compound according to an aspect of the present disclosure;

FIG. 3A illustrates a schematic chemical structure of an exemplary electrochromic compound conjugated with di-block compounds according to an aspect of the present disclosure;

FIG. 3B illustrates a schematic chemical structure of an exemplary electrochromic compound conjugated with tri-block compounds according to an aspect of the present disclosure;

DETAILED DESCRIPTION OF EMBODIMENTS

Figure 4A:
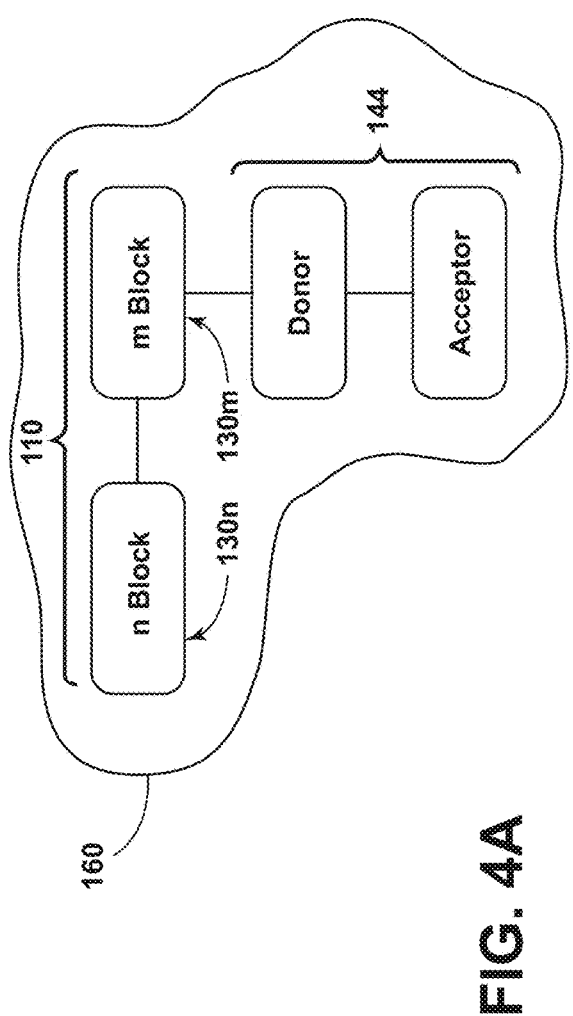
FIG. 4A illustrates a schematic chemical structure of an exemplary electrochromic compound conjugated with a di-block compound according to an aspect of the present disclosure.

The present illustrated embodiments reside primarily in combinations of materials, method steps, and apparatus components relating to block copolymers as components for electro-optic elements and electro-optic mediums, as discussed below. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Aspects of the present disclosure relate to conductive polymers, and, more particularly, to block copolymers as components for electro-optic elements and electro-optic mediums. The block copolymers of the present disclosure can be used in electro-optic elements and electrochromic devices incorporating such electro-optic elements. By way of introduction, electrochromic devices generally include an electrochromic medium that transitions between an inactivated state in which the electrochromic medium is relatively transparent to light having a wavelength within a predetermined wavelength range and an activated state in which the electrochromic medium has a decreased transmission to light within a predetermined wavelength range when an electrical potential is applied to the electrochromic device. The electrochromic medium includes an anodic component and a cathodic component (also referred to as electroactive components), at least one of which is also electrochromic. The electrochromic electroactive component can provide the electrochromic device with a perceived color when the electrochromic device is in the activated state and/or as the device transitions between the inactivated and activated states.

While aspects of the present disclosure are described in the context of the electro-optic element 20, aspects of the present disclosure may also be utilized in the context of other electrochromic or electro-optic devices. Non-limiting examples of which include interior and exterior mirror assemblies, bi-stable devices, interior and exterior windows, display screens, heads-up displays, vehicle window assemblies, architectural window assemblies, filter assemblies, eyewear, cameras, and display boards. Further, the block copolymers described herein may be applicable to other devices, including, but not limited to, substrates for an organic light-emitting diode ("OLED"), an organic field-effect transistor ("OFET"), and the like.

The term "electroactive," as used herein, refers to a material that can undergo a modification in its oxidation state upon exposure to a particular electrical potential difference. The term "electrochromic," as used herein, refers to a material that can exhibit a change in its extinction coefficient at one or more wavelengths upon exposure to a particular electrical potential difference. Electrochromic components, as described herein, include materials whose color or opacity are affected by an electrical current, such that when an electrical field is applied to the material, the color or opacity changes from a first state to a second state (e.g., the inactivated and activated states). Thus, an electrochromic device can exhibit a change in transparency as a result of electrochemical oxidation and reduction reactions that occur between electroactive components (e.g., the anodic components and the cathodic components), in which at least one of the electroactive components is also electrochromic. In other words, when a sufficient electrical potential difference is applied across electrodes of an electrochromic device, the electrochromic medium can shift from a substantially clear state (e.g., a high transmission state, such as the inactivated state) to a substantially dark or darkened state (e.g., a low transmission state, such as the activated state), as well as intermediate states thereto, in the event that one or more of the anodic and the cathodic components are oxidized and reduced, respectively. Specifically, the anodic components are oxidized by donating electrons to the anode and the cathodic components are reduced by accepting electrons from the cathode. Accordingly, the term "acceptor compound," as used herein, refers to an electron deficient compound and the term "donor compound," as used herein, refers to an electron rich compound. Examples of acceptor compounds include, but are not limited to, benzothiadiazole (BDT), benzoselenadiazole, quinoxaline, pyrazino (2,3-g) quinoxaline, isoindigo, pyrrolopyrrole-1,4-dione, and the like. Examples of donor compounds include, but are not limited to, carbazoles, fluorenes, silafluorenes, benzodithiophenes, thiophenes, cyclopentadithiophenes, and the like.

Referring to FIGS. 1A and 1B, reference numeral 10 generally designates an electro-optic element, which may be included in an electrochromic device 14 as previously described. The electro-optic element 10 can include a first substrate 18 having a first surface 22 and a second surface 26. A first electrically conductive layer 30 is disposed on the second surface 26. A second substrate 34 is provided opposite the first substrate 18 and includes a third surface 38 and a fourth surface 42. A second electrically conductive layer 46 is disposed on the third surface 38. The first substrate 18 and the second substrate 34, along with a sealing member 50 define a chamber 54 for containing an electrochromic medium 58 therein.

The electro-optic element 10 allows the electrochromic device 14 to be operable between a first state of the electro-optic element 10, which allows electromagnetic radiation having a wavelength within a predetermined wavelength range to pass through, and a second state, in which a portion, or no electromagnetic radiation having a wavelength within a predetermined wavelength range, is transmitted through the electro-optic element 10 (e.g., the electro-optic element 10 becomes generally opaque or partially opaque to electromagnetic radiation having a wavelength within the predetermined wavelength range). The second state of the electro-optic element 10 can be defined relative to the transmissivity of the first state. According to an aspect of the present disclosure, the transmissivity of electromagnetic radiation of a predetermined wavelength or wavelength range through the electro-optic element 10 in the first state may be greater than about 25%, greater than about 50%, greater than about 55%, or greater than about 85%. Typically, the percentage of reflectance, transmittance, and absorbance of the electro-optic element 10 sum to 100%. In some aspects, the transmissivity of electromagnetic radiation of the predetermined wavelength or wavelength range through the electro-optic element 10 in the substantially second state may be less than about 10%, less than about 1%, less than about 0.1%, less than about 0.01%, or less than about 0.001%.

The first and/or second substrates 18, 34 can be made of glass, plastic, or other optically transparent or translucent material(s), non-limiting examples of which include borosilicate glass, soda lime glass, or polymeric materials, such as natural and synthetic polymeric resins, plastics, and/or composites. Non-limiting examples of such include polyesters (e.g., PET), polyimides (PI), polycarbonates, polysulfones, polyethylene naphthalate (PEN), ethylene vinyl acetate (EVA), acrylate polymers, as well as cyclic olefin copolymers (COC) (such as those commercially available from TOPAS® Advanced Polymers). In some aspects, both the first and second substrates 18, 34 are made of an optically transparent or translucent material, while, in other aspects, only a single substrate, such as the first substrate 18, is made of an optically transparent or translucent material. The first and second substrates 18, 34 can be made from the same or different materials and may have the same or different dimensions.

The first and second electrically conductive layers 30, 46 can include one or more layers of an electrically conductive material disposed on the first and second substrates 18, 34, respectively. These layers serve as electrodes (e.g., the cathode and the anode) for the electro-optic element 10. The electrically conductive material(s) of the first and/or second electrically conductive layers 30, 46 may be any suitable material that includes one or more of the following features: (a) substantially transparent to electromagnetic radiation in the visible and/or infrared wavelength ranges; (b) bonds reasonably well to the first and second substrates 18, 34; (c) maintains the bond to the first and second substrates 18, 34 when associated with the sealing member 50; (d) generally resistant to corrosion from materials contained within the electrochromic device 14 or the atmosphere; and/or (e) exhibits minimal diffuse or specular reflectance as well as sufficient electrical conductance. Depending on the application, only one of the first and second electrically conductive layers 30, 46 may be required to be transparent while the other electrically conductive layer 30, 46 may be opaque. In some applications, both the first and the second electrically conductive layers 30, 46 may be transparent. According to some aspects, one of the first and second electrically conductive layers 30, 46, such as the second electrically conductive layer 46, may include a metal reflector or one or more coatings configured as a partially reflective, partially transmissive ("transflective") coating. Inclusion of a metal reflector or a transflective coating may render the electrochromic device at least partially reflective. Accordingly, the electrically conductive material(s) forming the first and second electrically conductive layers 30, 46 may be the same or different. Non-limiting examples of electrically conductive material that may be used to form the first and/or second electrically conductive layers 30, 46 can include transparent conductive oxides (TCOs) such as fluorine doped tin oxide (FTO), for example TEC™ glass, indium tin oxide (ITO), doped zinc oxide, indium zinc oxide (IZO), aluminum doped zinc oxide (AZO), and metal oxide/metal/metal oxide (where the metal oxide can be substituted with metal carbide, metal nitride, metal sulfide, etc.).

Still referring to FIGS. 1A and 1B, the sealing member 50 can traverse, or extend along, and cooperate with an approximate perimeter of, the first and second substrates 18, 34 to define the chamber 54 as substantially hermetic. The sealing member 50 may be disposed around a perimeter of the electrochromic medium 58 (e.g., extending from the second surface 26 to the third surface 38). The sealing member 50 may be in the form of any suitable seal type and material. For example, the sealing member 50 may include thermoplastic polyurethane (TPU).

In some examples, first and second annular bands 62, 64 of highly conductive material are optionally deposited around the perimeter of the first and second substrates 18, 34, respectively, and electrically-conducting structures 68

(e.g., conductive tape, clips, traces, or wires) are secured to the highly conductive material and spatially separated from one another. The electrically-conducting structures 68 may supply an electrical voltage to the first and second annular bands 62, 64 of highly conductive material to create a voltage across the electro-optic element 10, thereby reversibly driving the electro-optic element 10 between states, such as the substantially dark and substantially clear states. The first and second annular bands of highly conductive material 62, 64 may include silver, gold, copper, or aluminum (such as, for example, in a form of metallic flakes or particles dispersed in a hosting material).

The electro-optic element 10 includes the electrochromic medium 58. The electrochromic medium 58 includes at least one cathodic component and at least one anodic component. The anodic and cathodic components may, alternatively, be referred to as chromophores, electrochromic molecules, or electrochromic polymers. According to some aspects of the present disclosure, the anodic and/or cathodic components may be a polymer. In some aspects, both the cathodic and anodic components are electroactive and at least the anodic component is electrochromic. Further, the components of the electrochromic medium 58 can be utilized in solution form, gel form, or film form (e.g., a solid polymer or a gel polymer) in the electro-optic element 10. As such, the electrochromic medium 58 may include one or more layers of material(s) attached directly to an electrically conductive layer (e.g., 30, 46) or confined in close proximity to an electrically conductive layer (e.g., 30, 46), which remains attached or confined when components thereof are oxidized and/or reduced.

The electrochromic medium 58 can include one or more anodic components. Non-limiting examples of anodic components include tri-phenyl amines (TPAs), vanadium-titanium oxide ($VTiO_x$), metallocenes, 5,10-dihydrophenazines, phenothiazines, phenoxazines, carbazoles, triphenodithiazines, triphendioxazines, ferrocene, substituted ferrocenes, substituted ferrocenyl salts, phenazine, substituted phenazines, phenothiazine, substituted phenothiazines, including substituted dithiazines, thianthrene and substituted thianthrenes, di-tert-butyl-diethylferrocene, 5,10-dimethyl-5,10-dihydrophenazine (DMP), 3,7,10-trimethylphenothiazine, 2,3,7,8-tetramethoxy-thianthrene, 10-methylphenothiazine, tetramethylphenazine (TMP), bis(butyltriethylammonium)-para-methoxytriphenodithiazine (TPDT), 3,10-dimethoxy-7,14-(triethylammoniumbutyl)-triphenodithiazinebis(tetrafluoroborate), and combinations thereof.

The electrochromic medium 58 can include one or more cathodic components, which can include a reducible compound. Non-limiting examples of cathodic components include dioxythiophenes, viologens, low-dimerizing viologens, or non-dimerizing viologens. Illustrative viologens include, but are not limited to, methyl viologen, octyl viologen, benzyl viologen, polymeric viologens, and the viologens described in U.S. Pat. Nos. 4,902,108; 6,188,505; 5,998,617; 9,964,828; and 6,710,906, which are herein incorporated by reference in their entirety. In one aspect, the cathodic component is selected from a viologen, a low-dimerizing viologen, a non-dimerizing viologen, a substituted viologen, a di-acrylate viologen, a cathodic di-vinyl viologen, a cathodic di-vinyl ether viologen, a cathodic di-epoxy viologen, a cathodic di-oxetane viologen, a cathodic di-hydroxy viologen, or a combination thereof. In some examples, the electrochromic medium may include a combination of two or more cathodic components to provide the electrochromic medium 58 with a desired color when activated. Examples of suitable combinations of anodic and cathodic components can be found in U.S. Pat. No. 6,020,987, entitled "Electrochromic Medium Capable of Producing a Pre-Selected Color," issued Feb. 1, 2000, the contents of which are incorporated herein by reference in its entirety.

The electrochromic medium 58 may also include one or more electrolytes, which may be in the form of a solvent and a salt. The salt may be a metal salt or an ammonium salt. Non-limiting examples of suitable solvents for use in the electrolyte include: 3-methylsulfolane, dimethyl sulfoxide, dimethyl formamide, tetraglyme, and other polyethers; alcohols, such as ethoxyethanol; nitriles, such as acetonitrile, glutaronitrile, 3-hydroxypropionitrile, and 2-methylglutaronitrile; ketones, including 2-acetylbutyrolactone, and cyclopentanone; cyclic esters including beta-propiolactone, gamma-butyrolactone, and gamma-valerolactone; propylene carbonate (PC), ethylene carbonate; and homogenous mixtures thereof. Non-limiting examples of suitable salts include: metal or ammonium salts, such as lithium triflate, lithium perchlorate, sodium triflate, sodium perchlorate, etc., $Li^+$, $Na^+$, $K^+$, $NR'4^+$ (where each R' is individually H, alkyl, or cycloalkyl), or the following anions $F^-$, $Cl^-$, $Br^-$, $I^-$, $BF_4^-$, $PF_6^-$, $SbF_6^-$, $ASF_6^-$, $ClO_4^-$, $SO_3CF_3^-$, $N(CF_3SO_2)_2^-$, $C(CF_3SO_2)_3^-$, $N(SO_2C_2F_5)^-$, $Al(OC(CF_3)_3)_4^-$, or $BAr_4^-$, where Ar is an aryl or fluorinated aryl group such as, but not limited to, $C_6H_5$, $3,5-(CF_3)_2C_6H_3$, or $C_6F_5$.

The electrochromic medium 58 may, optionally, include additional materials, such as thermal initiators, light absorbers, light stabilizers, thermal stabilizers, antioxidants, oxygen scavengers, thickeners, viscosity modifiers, tint providing agents, redox buffers, and mixtures of any two or more such materials. According to aspects of the present disclosure, the additional materials may provide a solution-enhancing property. Non-limiting examples of UV-stabilizers used in the electrochromic medium 58 may include ethyl-2-cyano-3,3-diphenyl acrylate; (2-ethylhexyl)-2-cyano-3,3-diphenyl acrylate; 2-(2'-hydroxy-4'-methylphenyl)benzotriazole (such as that sold by Ciba-Geigy Corp. under the trademark Tinuvin® P); 3-[3-(2H-benzotriazole-2-yl)-5-(1,1-dimethylethyl)-4-hydroxyphenyl]propionic acid pentyl ester prepared from Tinuvin® 213, sold by Ciba-Geigy Corp., via conventional hydrolysis followed by conventional esterification (hereinafter "Tinuvin® PE"); 2,4-dihydroxybenzophenone; 2-hydroxy-4-methoxybenzophenone; and 2-ethyl-2'-ethoxyalanilide.

Referring now to the example depicted in FIG. 1A, the electrochromic medium 58 utilized with the electro-optic element 10 may include an electrochromic film, or electro-optic film 70 as previously discussed. As such, a device 14 incorporating the electro-optic film 70 may be in the form of a full film device. The electro-optic film 70 may be a polymeric material composed of a plurality of blended polymers or a single polymer. In such an example, the electro-optic film 70 may contain both the anodic component and the cathodic component on the backbones of a polymeric chain, and/or as pendant groups, which will be discussed further with respect to FIGS. 2A-5B. In the electro-optic film 70 example, the anodic component and the cathodic component are both positioned on the same polymer chains.

Referring now to the example depicted in FIG. 1B, in this example the electrochromic medium 58 utilized with the electro-optic element 10 includes both a cathodic film 74 and an anodic film 78. An electrolyte layer 84 separates the cathodic and anodic films 74, 78. In this way, the cathodic film 74, anodic film 78, and electrolyte layer 84 define the electrochromic medium 58. In such an example, the cathodic film 74 may contain the cathodic component on the backbone of the polymeric chains, and/or as pendant groups, while the anodic film 78 may contain the anodic component on the backbone of the polymeric chains, and/or as pendant groups, which will be discussed further with respect to FIGS. 2A-5B.

The electrolyte layer 84 may be a gel (e.g., a semi-liquid configured to permeate the cathodic and anodic films 74, 78) or a polymeric electrolyte configured as a thin film electrolyte. In examples utilizing a polymeric electrolyte as the electrolyte layer 84, the polymeric electrolyte may include a polymer, such as polymethyl methacrylate ("PMMA"), poly (styrene-ran-ethylene), polystyrene-block-poly(ethylene-ran-butylene), poly(styrene-ran-ethylene), polystyrene-block-poly(ethylene/butylene)-block-polystyrene, poly (ethylene glycol), poly(methyl methacrylate), other polymer electrolytes and/or combinations thereof and various plasticizers, such as propylene carbonate, ethylene carbonate, dimethyl carbonate, and the like. The electrolyte layer 84 may partially permeate the cathodic and anodic films 74, 78.

Recent synthetic research efforts toward conductive polymer designs have led to a need to tailor such polymers for enhanced process handling. Conductive polymers can be formulated to include certain properties that impart beneficial characteristics for process handling, such as certain molecular weights and solvent compatibility factors. For example, a properly formulated polymer can enhance solution quality for various coating techniques, including, but not limited to, slot die, gravure, inkjet, spray coating, etc. Utilizing polymer blends (e.g., polymers which are not formulated as a single, bulk material) to impart desired properties to a material may provide some benefit. However, the chemical synthesis of each different blend must be controlled independently.

Currently, conductive polymers may be formulated using linear polymerization (e.g., aryl coupling), which may yield polymers having tuned absorbance in a range from UV-visible wavelengths to near-infrared wavelengths. For example, conductive polymers derived from thiophene-based chemistries may utilize aryl coupling methods to combine various donor and acceptor compounds to alter a polymer band-gap and mobility of the associated electrochromic material. Electrochromic materials made in this manner often require a solubilizing unit to make the polymer solution processable. A drawback to this approach is that only one polymer may be tuned at one time to a desired color. Further, the incorporation of acceptor compounds often reaches a limit, depending on the compound, which may make further improvements difficult.

In accordance with the present disclosure, it has been discovered that creating polymers with specific functionalities at each block as a single, bulk material by incorporating conjugation into the chemistry of the polymer (e.g., side-chain modification[s]) benefits overall pre-polymerized processability and the resulting morphology of the polymer. Block polymers, such as di-block copolymers and tri-block copolymers, allow fine control over individual blocks to tailor molecular weights at each unit and/or incorporate a variety of tuned colors. Further, the incorporation of conjugation into the chemistry (e.g., formulating the conductive polymer as a bulk material rather than a polymer blend) is beneficial to the electro-optic element 10 for improved electrochromic device speed, electrochromic response time, and device stability and durability. Further, block copolymers of the present disclosure decrease susceptibility of the electro-optic element 10 to degradation, thereby providing a more durable device. Conventional conductive polymer blends may tend to have resistive loss due to the chemical structure and processing of the blends, which can result in a slower absorbance switching (i.e., color/bleaching) response times.

Referring now to FIGS. 2A-5B, aspects of the present disclosure relate to formulating block copolymers, which may include blocks of donor, donor-acceptor, or other units in either a di-block, tri-block or mixed (e.g., di and tri) form (e.g., multiple polymerized block copolymer units). The block copolymer units described herein may be polymerized to form conductive polymers, shown schematically as reference numeral 100, or used as components thereof for use as or within electrochromic mediums. Accordingly, these compounds may form the electrochromic medium 58, the electro-optic film 70, or components thereof, such as the cathodic film 74, the anodic film 78, and/or the electrolyte layer 84. However, it is within the scope of aspects described herein for the block copolymers of the present disclosure to be incorporated into any suitable medium. For example, the block copolymers of the present disclosure may be used in a medium that is applied to a substrate for an OLED or an OFET device. FIG. 2A illustrates a schematic of the chemical structure of an exemplary di-block compound 110, or block copolymer unit. FIG. 2B illustrates a schematic of the chemical structure of an exemplary tri-block compound 120, or block copolymer unit. In specific examples, a di-block copolymer comprises a compound of Formula (II) and a tri-block copolymer comprises a compound of Formula (III):

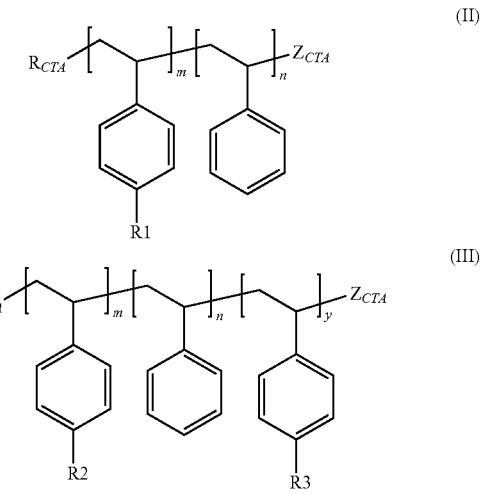

According to aspects described herein, the blocks 130 (e.g., "m" 130*m*, "n" 130*n*, "y" 130*y*) forming the di-block and/or tri-block copolymers 110, 120 of the present disclosure include R groups (e.g., R1, R2, R3, etc.), which may include any side-chain modification, chain transfer agent (CTA), or polymerizable compound suitable for use in conductive polymers. Chain transfer agents are illustrated as $R_{CTA}$ and $Z_{CTA}$, which may both form the chain transfer agent. In this way, the polymer 100 grows between $R_{CTA}$ and $Z_{CTA}$. The CTA is part of a reversible addition-fragmentation chain transfer (RAFT) process and may provide increased control over the molecular weight and polydisperity of the resulting compound. A variety of CTA materials may be used, including, but not limited to, thiocarbonylthio compounds, such as dithioesters, dithiocarbamates, trithiocarbonates, xanthates, and the like. According to aspects of the present disclosure, the CTAs may be substituted with other thiocarbonylthio compounds, such as dithioesters, dithiocarbamates, trithiocarbonates, xanthates. Specific examples of such include 1-methyl-1-phenylethyl ester, 1-cyano-1-methylethyl ester, 2-(Dodecylthiocarbonothioylthio)-2-methylpropionic acid, but are not limited to such. Accordingly, the CTA may include $R_{CTA}$ and $Z_{CTA}$, which are components of varying compositions. While illustrated as including CTA groups, the blocks 130 forming the di-block 110 and/or tri-block 120 copolymers of the present disclosure may be formed without using CTA groups (e.g., not including an $R_{CTA}$ or $Z_{CTA}$ end-group). In this way, free radical polymerization may be performed, thereby yielding random copolymers. The R and Z groups may provide specific functionalities providing a benefit (e.g., a desired characteristic) to the conductive polymer, such as a solution-enhancing property. In non-limiting examples, specific functionalities may include increased processability, adhesion, advantageous morphology characteristics, thermal initiating, light absorbance, light stabilizing, thermal stabilizing, antioxidants, oxygen scavenging, thickening, viscosity modifying, tinting/coloring, redox buffering, and the like. Further, the R and Z groups may be in the form of a compound that configures the conductive polymer as an electroactive material (e.g., donor/acceptor compounds). In this way, the di-block 110 or tri-block 120 compounds of the present disclosure may include R and/or Z groups providing specific, desired, functionalities and/or R and/or Z groups provided to enable further polymerization of the conductive polymer and/or include electroactive properties, schematic examples of which are illustrated in FIGS. 3A-5B.

As such, the di-block 110 and tri-block 120 copolymers of Formulas (II) and (III) may include $R_{CTA}$ and $Z_{CTA}$ groups (typically from a CTA) which may be chosen from any suitable CTA or conversion of CTAs. Likewise, R1, R2 and R3 groups may be any suitable compound(s). It is understood that the number of R groups depends on the specific di-block or tri-block formula. As such, di-block compounds 110 and tri-block compounds 120 of the present disclosure may include less than or more than the 3 R groups shown in Formulas (II) and (III). Further, an R or Z group may function as a cap, a linker, or may be reacted further with additional compounds. For example, a di-block 110 copolymer 100 having a linker (R2) may include a compound of Formula (IV) and a tri-block 120 copolymer 100 may include a compound of Formula (V):

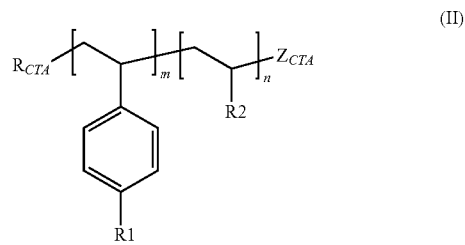

(II)

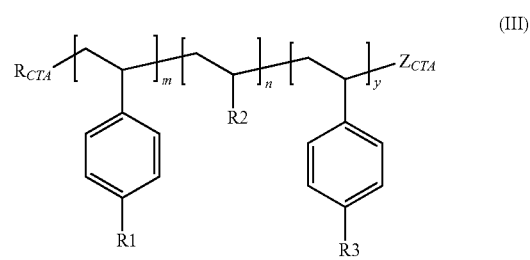

(III)

FIG. 3A illustrates a schematic chemical structure of an exemplary electrochromic compound 140 conjugated, or covalently bound, with di-block compounds 110, according to an aspect of the present disclosure. In specific examples, the electrochromic compound 140 conjugated with di-block compounds 110 includes a compound of Formula (VI). Specifically, dioxythiophene is attached to the m-block position 130m having non-limiting examples of R1 attachments. It is understood that the un-reacted (e.g., prior to reaction) thiophene unit can undergo further modification and/or polymerization. In this way, the un-reacted thiophene functions as a linker. Also, the un-reacted thiophene may be coupled with an acceptor or donor-acceptor 144 compound to tune a color of the medium 58.

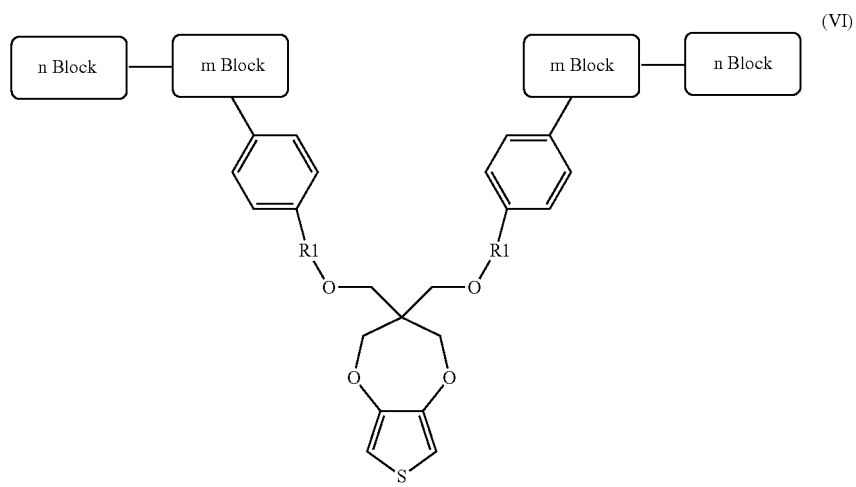

(VI)

In specific examples, the electrochromic compound 140 conjugated with di-block compounds 110 includes a compound of Formula (VII). Specifically, dioxythiophene is attached to the m-block position 130m having non-limiting examples of R1, R2, and R3 attachments. It is understood that the un-reacted thiophene unit can undergo further modification and/or polymerization.

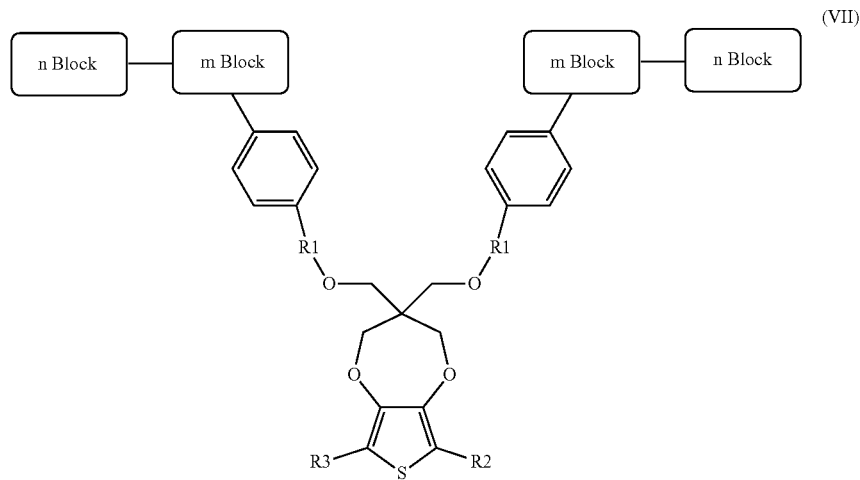

(VII)

In other examples, the electrochromic compound 140 conjugated with di-block compounds 110 includes a compound of Formula (VIII). Specifically, a tri-phenyl amine is shown attached to the m-block 130m position having non-limiting examples of R1, R2, and R3 attachments.

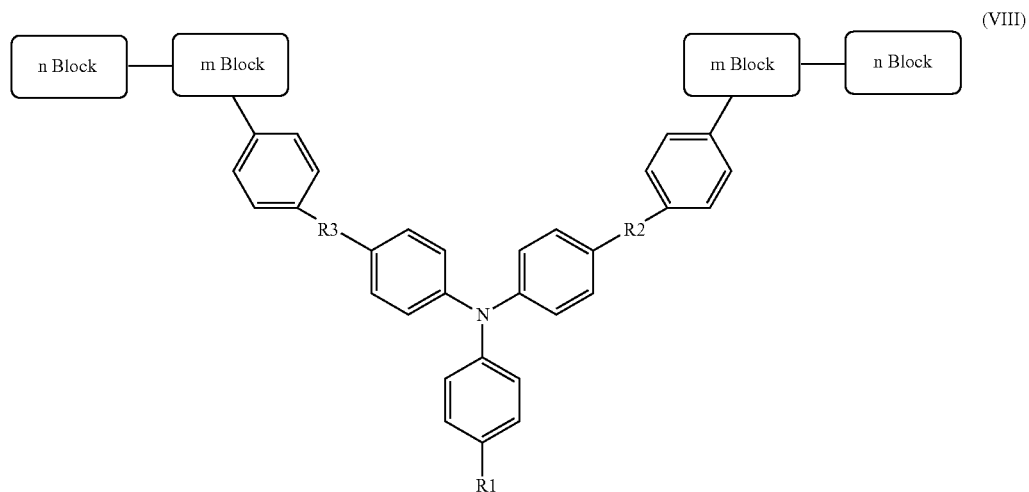

(VIII)

In yet other examples, an electrochromic compound conjugated with a di-block compound 110 includes a compound of Formula (IX). Specifically, a tri-phenyl amine is added at the m-block position 130m of a single di-block copolymer and includes non-limiting examples of R2 and R3 attachments.

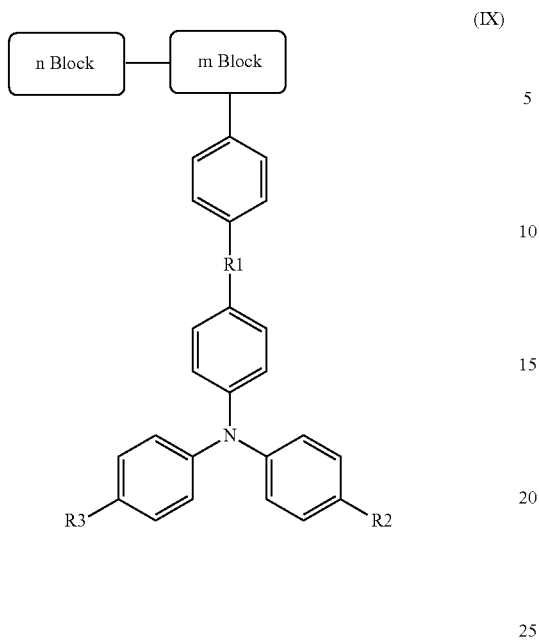

(IX)

FIG. 3B illustrates a schematic chemical structure of an exemplary electrochromic compound 150 conjugated with tri-block compounds 120, according to an aspect of the present disclosure. In specific examples, the electrochromic compound 150 conjugated with tri-block compounds 120 includes a compound of Formula (X). Specifically, dioxy-thiophene is attached to the m-block position 130*m* having non-limiting examples of R1 attachments. It is understood that the un-reacted thiophene unit can undergo further modification and/or polymerization.

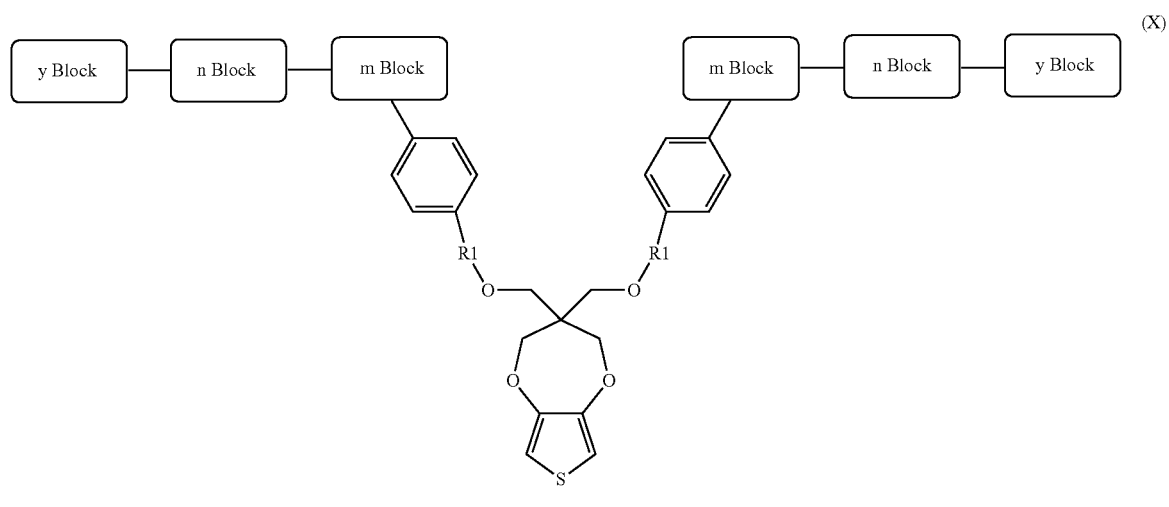

(X)

In other examples, the electrochromic compound 150 conjugated with tri-block compounds 120 includes a compound of Formula (XI). Specifically, a tri-phenyl amine is shown attached to the m-block position 130*m* having non-limiting examples of R1, R2, and R3 attachments.

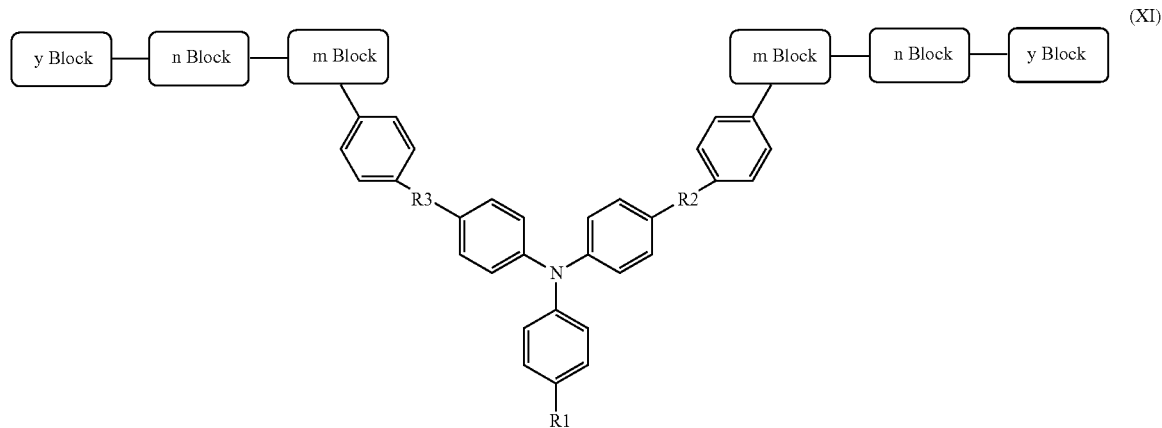

(XI)

In other examples, the electrochromic compound 150 conjugated with tri-block compounds 120 includes a compound of Formula (XII). Specifically, a different tri-phenyl amine is shown attached to the m-block position 130*m* having non-limiting examples of R1, R2, R3, and R4 attachments.

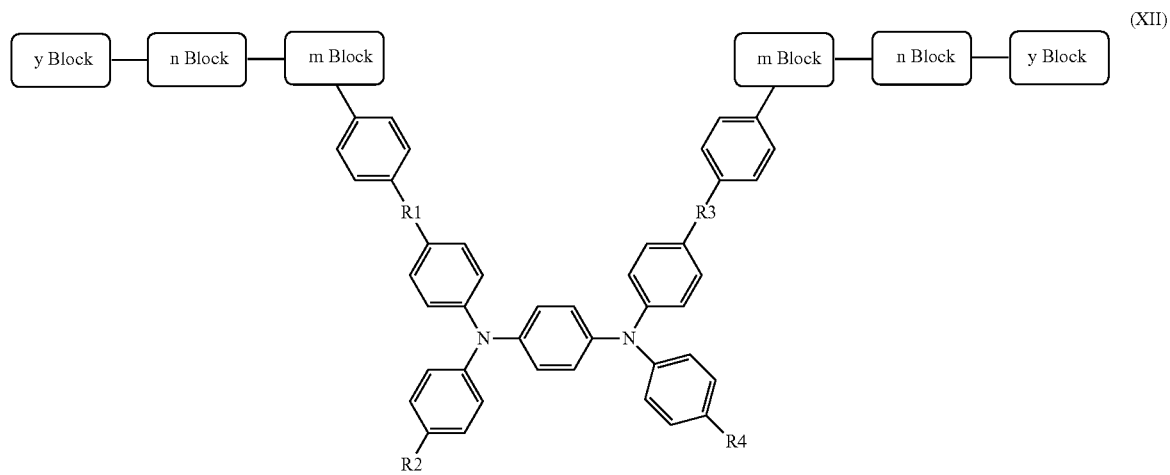

(XII)

In yet other examples, an electrochromic compound conjugated with a tri-block compound 120 includes a compound of Formula (XIII). Specifically, a different tri-phenyl amine is added at the y-block position 130*y* of a single tri-block copolymer 120 and includes non-limiting examples of R1, R2, R3, and R4 attachments.

(XIII)

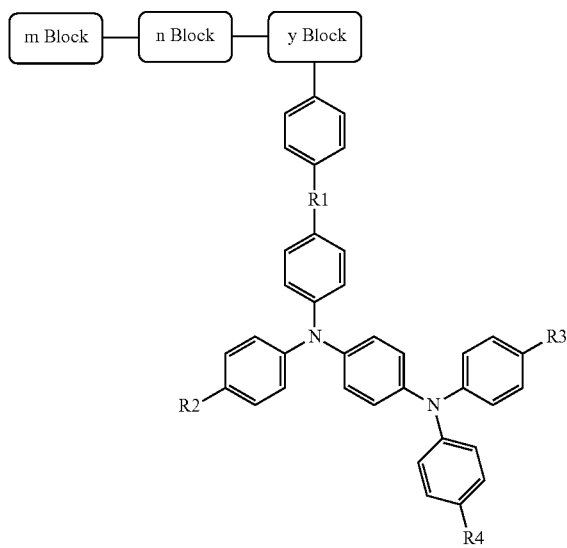

(XV)

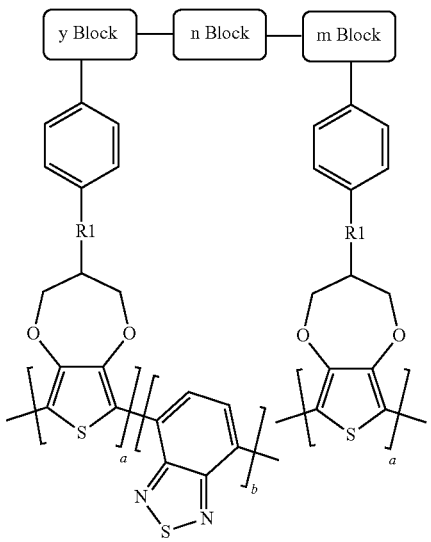

Figure 4B:
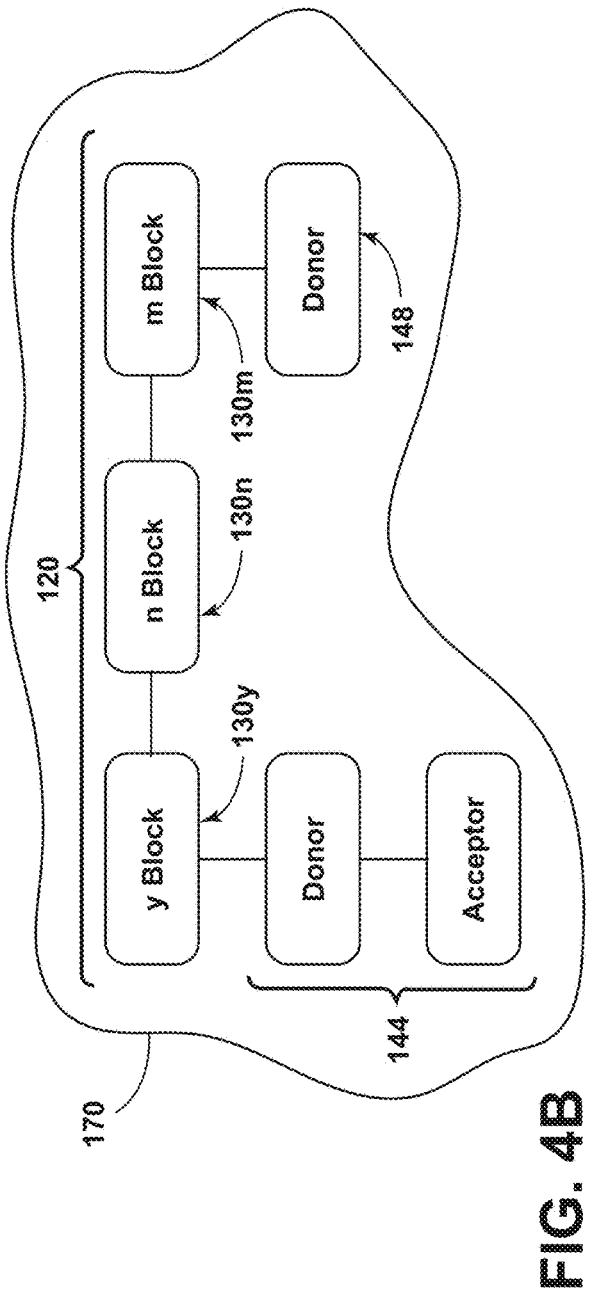
FIG. 4B illustrates a schematic chemical structure of an exemplary electrochromic compound conjugated with a tri-block compound according to an aspect of the present disclosure.

FIG. 4A illustrates a schematic chemical structure of an exemplary electrochromic compound 160 conjugated with a di-block compound 110, while FIG. 4B illustrates a schematic chemical structure of an exemplary electrochromic compound 170 conjugated with a tri-block compound 120, according to aspects of the present disclosure. In specific examples, the electrochromic compound 170 conjugated with a tri-block compound 120 includes compound of Formula (XIV), Formula (XV), and Formula (XVI). Formula (XIV) and Formula (XV) illustrate a donor-acceptor compound 144 (at y-block 130n) separated by an n-block, 130n, from a donor compound 148 (at m-block 130m).

(XIV)

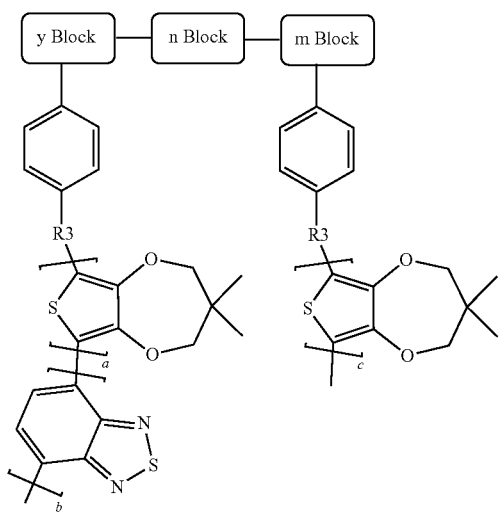

Formula (XVI) is a non-limiting example where a tri-phenyl amine (TPA-'1') compound within the same tri-block copolymer 120 is separated by an n-block, 130n, from a different tri-phenyl amine (TPA-'2') compound. In this example, different "colors" and/or monomers are conjugated (e.g., covalently bonded) into the tri-block copolymer 120 as a single polymerization. For example, the copolymer can include two or more visibly colored chain transfer agent side-chain modifications, where each visibly colored chain transfer agent side-chain modification includes a distinct hue from the other. This is a direct benefit to effective scalability of the compound 120, which may include producing an array of desired colors based on a mixture of two or more chain transfer agent side-chain modifications having distinct hues. Another benefit includes the ability to produce a monomer providing a same or single color, but having a different redox potential as compared to a compound including only a single TPA compound.

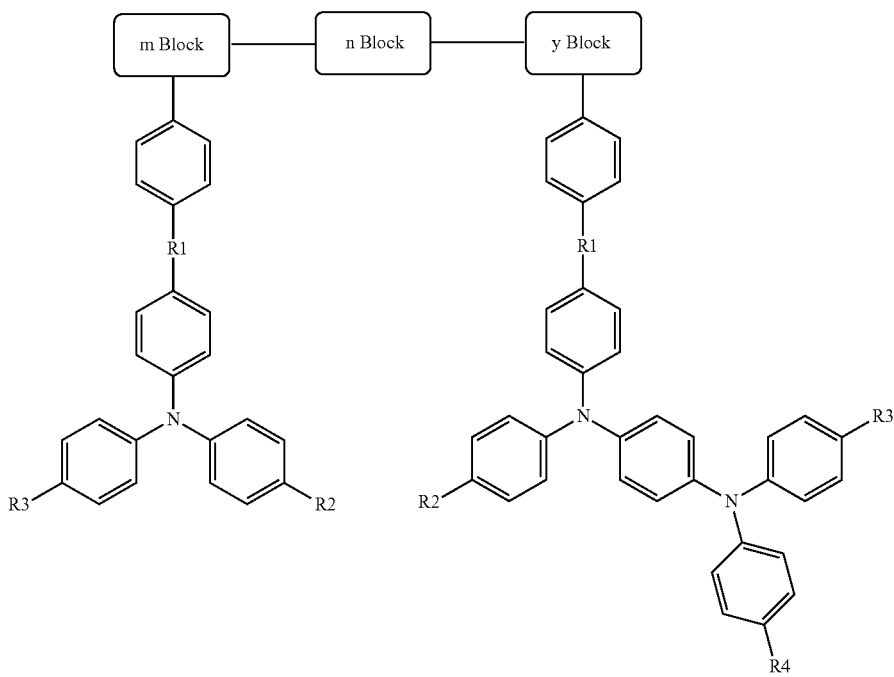

(XVI)

Figure 5A:
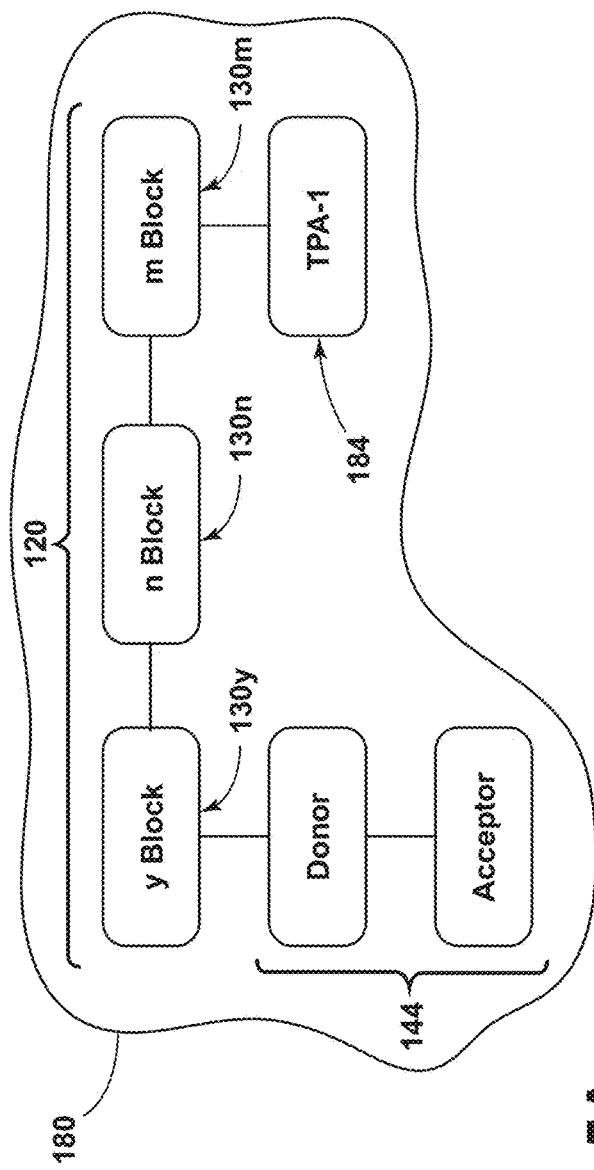
FIG. 5A illustrates a schematic chemical structure of an exemplary electrochromic compound and an auxiliary material conjugated with a tri-block compound according to an aspect of the present disclosure.

FIG. 5A illustrates a schematic chemical structure of an exemplary electrochromic compound 180 including an auxiliary material 184 conjugated with a tri-block compound 120, according to an aspect of the present disclosure. Specifically, FIG. 5A illustrates combining TPA-1 (e.g., at m-block 130*m*) separated by an n-block, 130*m*, from a donor-acceptor compound 144 (e.g., at y-block 130*y*). In this way, different conductive/non-conductive materials used as the auxiliary material 184 may be co-polymerized to form the compound 180.

Figure 5B:
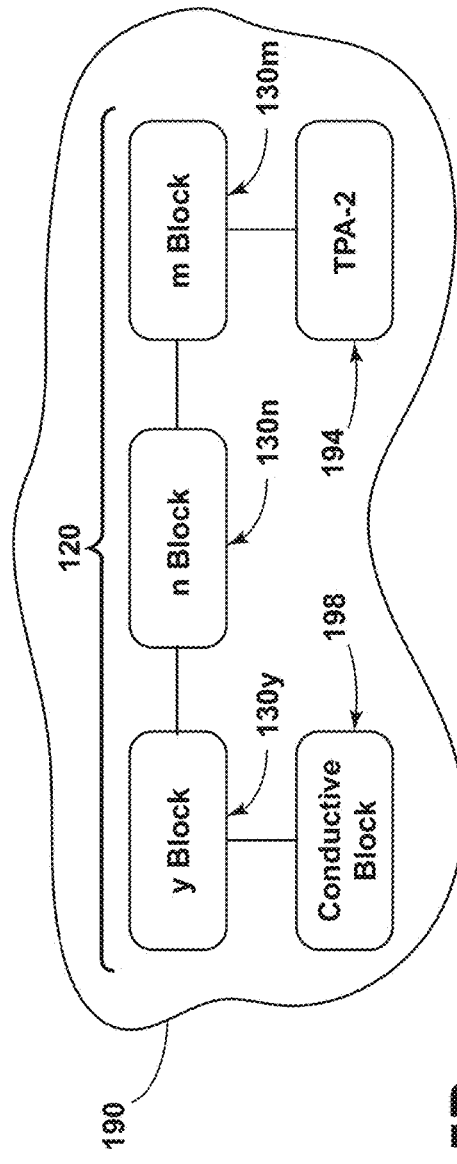
FIG. 5B illustrates a schematic chemical structure of an exemplary conductive compound and an auxiliary material conjugated with a tri-block compound according to an aspect of the present disclosure.

FIG. 5B illustrates a schematic chemical structure of an exemplary conductive compound 190 and an auxiliary material conjugated 194 with a tri-block compound 120, according to an aspect of the present disclosure. Specifically, FIG. 5B illustrates combining a conductive (not necessarily electrochromic) polymer 198 at a y-block 130*y* in combination with the auxiliary TPA-2 material 194 (e.g., at m-block 130*m*), which are separated by an n-block, 130*n*.

Accordingly, the exemplary block copolymers 110, 120 disclosed herein may include different materials conjugated into the chemistry of the polymers 100, which provide a solution-enhancing property. A solution-enhancing property may impart a characteristic to the solution, or polymer 100, and/or electro-optic/electrochromic medium 58 that provides a benefit. Non-limiting examples of beneficial properties include increased processability, adhesion, or advantageous morphology characteristics as previously described. As such, exemplary block copolymers 110, 120 disclosed herein allow for mixing conductive polymers 100 having desired properties, or characteristics, such as UV-visible absorbance in the dark state with other color materials. In some examples, the described di-block and/or tri-block approach may be utilized with thiophene-based systems, such as dioxythiophene compounds. For example, a single dioxythiophene unit may be tailored with one or more di-block or tri-block copolymers as previously described. In other examples, the di-block and tri-block approach may be utilized with a variety of tri-phenyl amine compounds, as previously described. The di-block and tri-block approaches described herein can provide fine control of properties for cathodic conducting polymers, such as dioxythiophenes, and anodic "coloring" polymers, such as tri-phenyl amines. It is to be understood that the classification of cathodic or anodic materials is largely associated with redox potentials. In this way, dioxythiophenes may function as anodic materials (e.g., an acceptor and thiophene compound) and tri-phenyl amines may function as cathodic materials, depending on the redox potential of the compound.

Further aspects of the present disclosure relate to electrochromic-functionalized blocks (e.g., 144 at 130*n*, 130*m*, 130*y*, etc.) separated by various functional moieties (e.g., auxiliary materials 184, 194, non-populated styrene, sulfonic, aliphatic, aromatic, etc.). In some examples, the electrochromic-functionalized blocks (e.g., 144 at 130*n*, 130*m*, 130*y*, etc.) may include styrene blocks, acrylate blocks, ether blocks, ester blocks, acrylamide blocks and methacrylate blocks, and the like. The functional moieties may include a solution-enhancing property. In other examples, the functional moieties may be utilized to incorporate color or non-coloring conductive attachments (e.g., side chain modifications) with a compound, such as tri-phenyl amine. In this way, various tuned tri-phenyl amines (e.g., including a modified redox potential and/or color) may be combined into a single block copolymer for further polymerization into electrochromic-functionalized blocks (e.g., styrene) with various spacers and side-chain modifications. Specific examples of a side-chain modification include a chain transfer agent side-chain modification.

In other words, the di-block copolymers 110 and the tri-block copolymers 120 of the present disclosure may include a chain transfer agent side-chain modification. For example, a di-block copolymer 110 or tri-block copolymer 120 may impart an alteration in oxidation state of a first donor compound or a second donor compound, which may include dioxythiophene or a tri-phenyl amine. In another example, a di-block copolymer 110 or first tri-block copolymer 120 includes a visibly colored chain transfer agent side-chain modification.

The following examples describe various features and advantages provided by the disclosure and are in no way intended to limit the invention and appended claims.

EXAMPLES

Example 1

Figure 6:
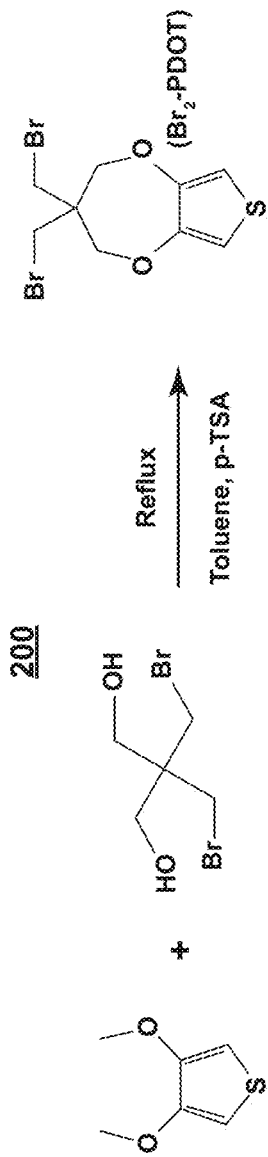
FIG. 6 illustrates an exemplary synthetic scheme according to aspects of the present disclosure.

FIG. 6, pertaining to Example 1, illustrates an exemplary synthetic scheme, 200, for synthesizing a donor compound 3,3-bis(bromomethyl)-3,4-dihydro-2H-thieno[3,4-b][1,4]dioxepine ("$Br_2$-PDOT"). It is understood that $Br_2$-PDOT may be synthesized according to other processes. It is also understood that Scheme 1, 200, may include additional, or alternative, steps without deviating from the scope of the present disclosure.

In an initial step, 5.0 grams of 3,4-Dimethoxythiophene, 10.9 grams of 2,2-bis(bromomethyl) propane-1,3-diol, and 6.75 grams of p-toluenesulfonic acid were added to 150 milliliters of anhydrous toluene and stirred until completely dissolved. The solution was degassed with vacuum pump/$N_2$ purge cycles three times using a Schlenk line. The solution was heated to reflux, whereby methanol was removed during the synthesis via distillation and maintaining a vapor temperature of approximately 60° C. Next, the reaction was cooled to room temperature, followed by the addition of water. The organic layer was separated from the aqueous layer followed by an additional water washing with 3 wt. % $NaHCO_3$. The organic layer was, again, washed with water and separated from the aqueous layer. A final water washing step was repeated to ensure removal of impurities, etc. The separated organic layer was rotary evaporated to remove solvent, and vacuum dried, yielding a solid product. The product was purified by column chromatography using a hexane/ethyl acetate mixture. Purity of the resulting $Br_2$-PDOT by gas chromatography-mass spectrometry (GC-MS) was greater than 99%.

Example 2

Figure 7:
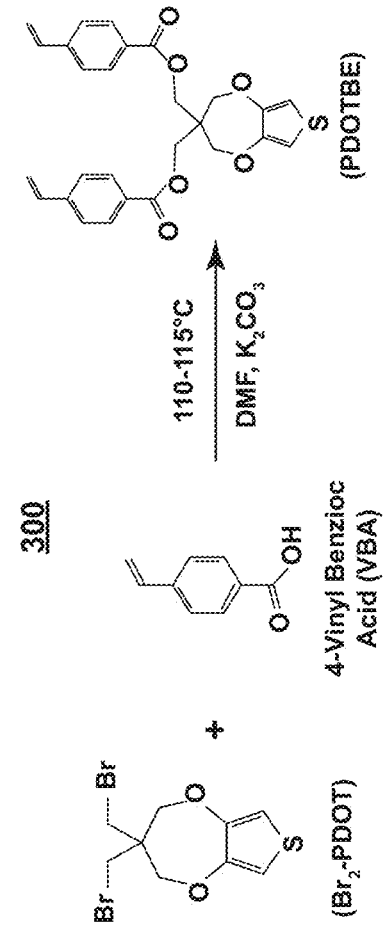
FIG. 7 illustrates an exemplary synthetic scheme according to aspects of the present disclosure.

FIG. 7, pertaining to Example 2, illustrates an exemplary synthetic scheme 300 for synthesizing {3-[(4-ethenylbenzoyloxy)methyl]-2H, 3H, 4H-thieno[3,4-b][1,4]dioxepin-3-yl}methyl 4-ethenylbenzoate ("PDOTBE"), which may function as a monomer having vinyl groups (e.g., X linkers), which may be reacted to carry blocks, such as n and m blocks 130n, 130m, or function as a CTA. An example of such is illustrated with respect to FIG. 8. It is understood that PDOTBE may be synthesized according to other processes. It is also understood that Scheme 2, 300, may include additional, or alternative, steps without deviating from the scope of the present disclosure.

In an initial step, 5.0 grams of $Br_2$-PDOT, 4.7 grams of vinyl benzoic acid, and 9.76 grams of $K_2CO_3$ were added to anhydrous 300 milliliters of N,N-dimethylformamide and stirred for 1 hour. The solution was degassed with vacuum pump/$N_2$ purge cycles three times using a Schlenk line. The solution was heated to 110-115° C. for at least 48 hours. Next, the reaction was cooled to room temperature, followed by filtering $K_2CO_3$. The filtrate was extracted into diethyl ether followed by $H_2O$ washing three times. The organic layer was separated from the aqueous layer and rotary evaporated to remove solvent. The remaining contents were dissolved in acetone, followed by precipitation with an excess of methanol. The solid was purified by column chromatography with hexane/ethyl acetate. The final product was vacuum dried overnight at 50° C. Purity of the resulting PDOTBE measured by high-performance liquid chromatography (HPLC) was greater than 99%.

Example 3

Figure 8:
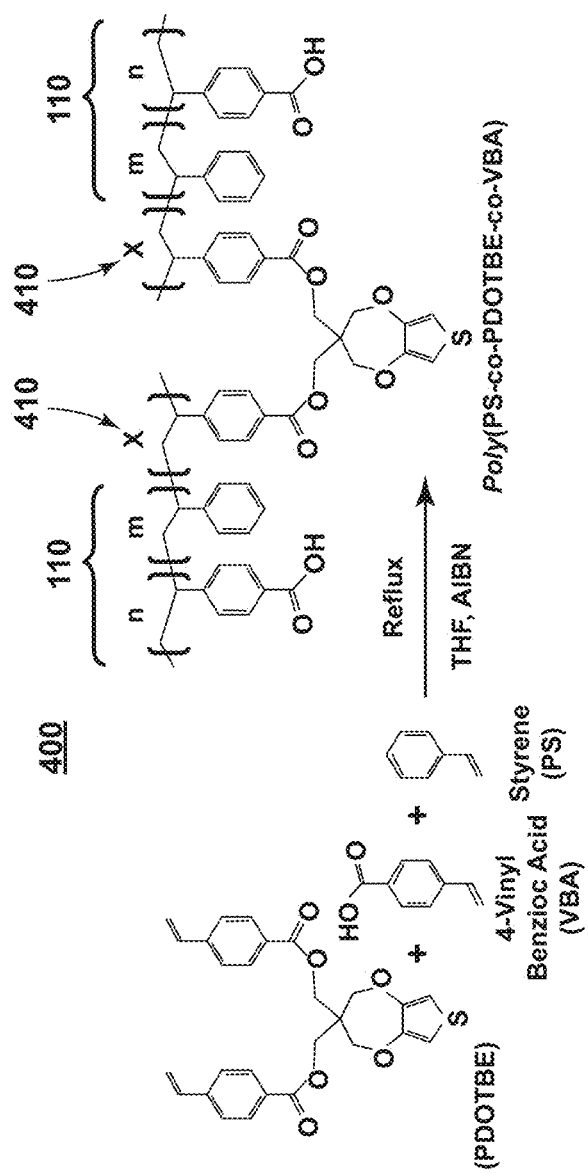
FIG. 8 illustrates an exemplary synthetic scheme according to aspects of the present disclosure.

FIG. 8, pertaining to Example 3, illustrates an exemplary synthetic scheme, 400, for synthesizing co-polymer poly (PS-co-PDOTBE-co-VBA), which may function as a di-block copolymer 110. It is understood that poly(PS-co-PDOTBE-co-VBA) may be synthesized according to other processes. It is also understood that Scheme 3, 400, may include additional, or alternative, steps without deviating from the scope of the present disclosure.

In an initial step, 1.0 gram of PDOTBE, 0.218 grams of styrene (including PS), 0.309 grams of 4-vinyl benzoic acid ("VBA") and 0.005 grams of azobisisobutyronitrile ("AIBN") (eq.) were dissolved in 50 milliliters of THF. The mixture was heated to reflux and reacted for varying times. Next, the reaction was cooled to room temperature, and the solvent was removed by rotary evaporation. The solid was precipitated using diethyl ether and filtered to remove unreacted monomer. The solid was re-dissolved in THF and rotary evaporated and re-precipitated using diethyl ether. The final solid was dried under vacuum at 50° C. In Scheme 3, 400, blocks n and m are different molar equivalents, and X, 410, refers to PDOTBE as a linker to other monomer or polymeric units. It is within the scope of the disclosure for the X units 410 to be connected or not connected.

Example 4

Figure 9:
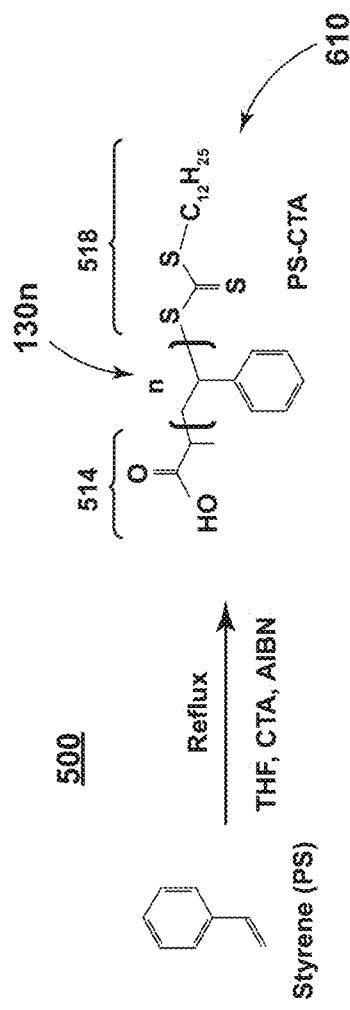
FIG. 9 illustrates an exemplary synthetic scheme according to aspects of the present disclosure.

FIG. 9, pertaining to Example 4, illustrates an exemplary synthetic scheme, 500, for synthesizing a poly (PS-CTA) block. It is understood that the poly (PS-CTA) block may be synthesized according to other processes. It is also understood that Scheme 4, 500, may include additional, or alternative, steps without deviating from the scope of the present disclosure. As illustrated in Scheme 4, 500, a chain transfer agent (CTA) 510 includes $R_{CTA}$ and $Z_{CTA}$ groups 514, 518, respectively. Thus, the poly (PS-CTA) block may be further processed into a repeating polymer. In this way, the polymer is inserted between the $R_{CTA}$ and $Z_{CTA}$ groups 514, 518, respectively, and propagates, thereby generating a block (e.g., 130n), which may be preserved for further reactions to obtain block copolymers (e.g., 110, 120).

In an initial step, 2.0 grams of styrene, 0.004 grams of chain transfer agent (CTA) 2-(Dodecylthiocarbonothioylthio) propionic acid, and 0.001 grams of AIBN were dissolved in 50 milliliters of THF. The mixture was heated to reflux and reacted for varying times. Next, the reaction was cooled to room temperature, and the solvent and unreacted monomer were removed by rotary evaporation, distillation, and filtration. The solid was re-dissolved in THF and re-precipitated using diethyl ether to remove unreacted monomers and impurities. The final solid was dried under vacuum at 50° C.

Example 5

Figure 10:
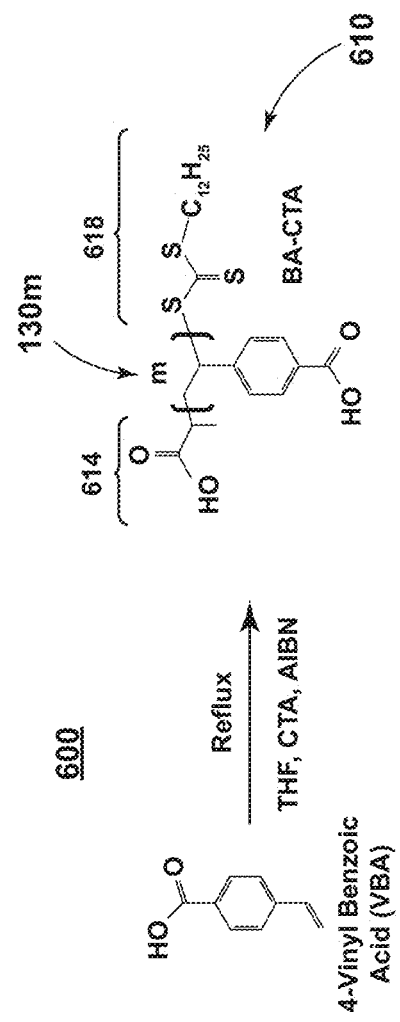
FIG. 10 illustrates an exemplary synthetic scheme according to aspects of the present disclosure.

FIG. 10, pertaining to Example 5, illustrates an exemplary synthetic scheme, 600, for synthesizing a poly (BA-CTA) block. It is understood that the poly (BA-CTA) block may be synthesized according to other processes. It is also understood that Scheme 5, 600, may include additional, or alternative, steps without deviating from the scope of the present disclosure. As illustrated in Scheme 5, 600, the poly (BA-CTA) block is a CTA 610 having $R_{CTA}$ and $Z_{CTA}$ groups, 614, 618, respectively. In this way, the polymer is inserted between the $R_{CTA}$ and $Z_{CTA}$ groups 614, 618, respectively, and propagates, thereby generating a block (e.g., 130m), which may be preserved for further reactions to obtain block copolymers (e.g., 110, 120).

In an initial step, 0.5 grams of 4-vinyl benzoic acid (VBA), 0.004 grams of chain transfer agent (CTA) 2-(Dodecylthiocarbonothioylthio) propionic acid, and 0.001 grams of AIBN were dissolved in 50 milliliters of THF. The mixture was heated to reflux and reacted for varying times. Next, the reaction was cooled to room temperature, and the solvent and un-reacted monomer were removed by rotary evaporation and distillation. The solid was precipitated using diethyl ether. The solid was re-dissolved in THF and re-precipitated using diethyl ether to remove unreacted monomers. The final solid was dried under vacuum at 50° C.

In other examples of Schemes 4 and 5, 500 and 600, the styrene or 4-vinyl benzoic blocks shown in PS-CTA and BA-CTA, respectively, may be replaced by, or substituted with, the following, non-limiting examples: 2-ethylhexanoic acid vinyl ester, methacrylic acid 2,2,6,6-tetramethyl-4-piperidyl ester, isooctyl vinyl ether, cyclohexyl vinyl ether, benzoic acid vinyl ester, propyl vinyl ether, isobutyl vinyl ether, vinyl methacrylate, vinyl propionate, vinyl pivalate, sodium 4-vinylbenzenesulfonate, 3-sulfopropyl methacrylate potassium salt, 4-aminostyrene, 4-bromostyrene, 3-(trimethoxysilyl) propyl methacrylate, etc. Further, the chain transfer agents may be replaced by, or substituted with, other thiocarbonylthio compounds, such as dithioesters, dithiocarbamates, trithiocarbonates, xanthates, with the following non-limiting examples: 1-methyl-1-phenylethyl ester, 1-cyano-1-methylethyl ester, 2-(Dodecylthiocarbonothioylthio)-2-methylpropionic acid, etc.

Example 6

Figure 11:
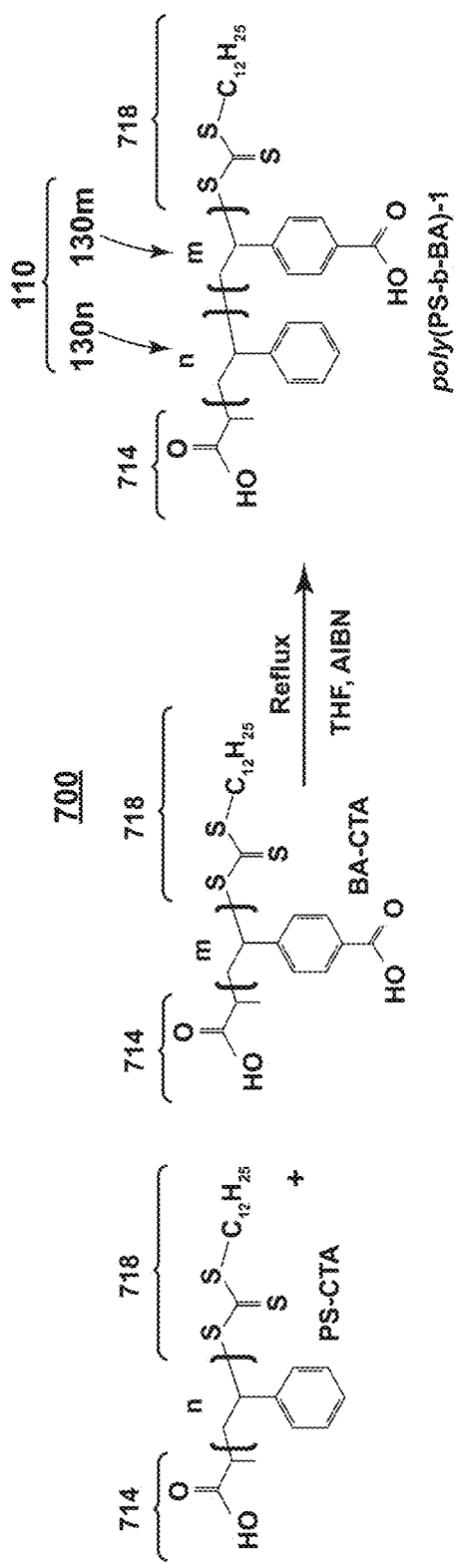
FIG. 11 illustrates an exemplary synthetic scheme according to aspects of the present disclosure.

FIG. 11, pertaining to Example 6, illustrates an exemplary synthetic scheme, 700, for synthesizing di-block poly(PS-b-BA)-1. It is understood that the di-block poly(PS-b-BA)-1 may be synthesized according to other processes. It is also understood that Scheme 6, 700, may include additional, or alternative, steps without deviating from the scope of the present disclosure. As illustrated in Scheme 6, 700, the CTA includes $R_{CTA}$ and $Z_{CTA}$ groups 714 and 718, respectively. In an initial step, 0.25 grams of poly (BA-CTA), 0.25 grams of poly (PS-CTA), and 0.001 grams of AIBN were dissolved in 50 milliliters of THF. The mixture was heated to reflux and reacted for varying times. Next, the reaction was cooled to room temperature, and the solvent and un-reacted monomer was removed by rotary evaporation and distillation. The solid was precipitated using diethyl ether. The solid was re-dissolved in THF and re-precipitated using diethyl ether to remove unreacted monomers. The final solid was dried under vacuum at 50° C. An advantage of the processes of Scheme 6, 700, is further control of molecular weight and polydispersity.

Example 7

Figure 12:
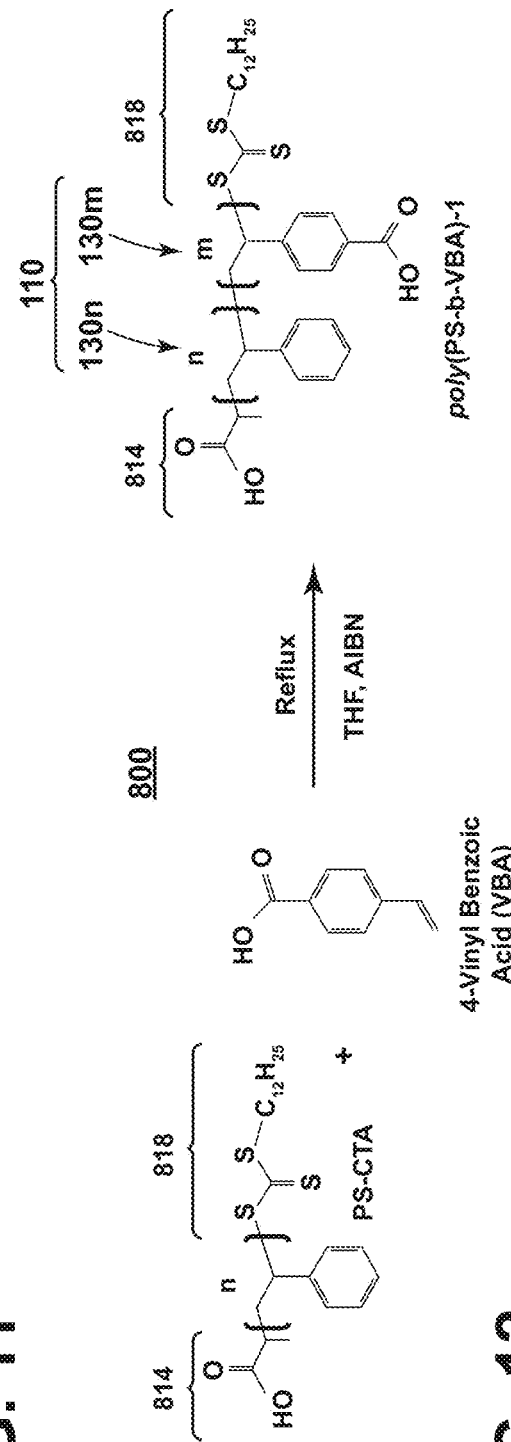
FIG. 12 illustrates an exemplary synthetic scheme according to aspects of the present disclosure.

FIG. 12, pertaining to Example 7, illustrates an exemplary synthetic scheme, 800, for synthesizing di-block poly(PS-b-VBA)-1). It is understood that the di-block poly(PS-b-VBA)-1) may be synthesized according to other processes. It is also understood that Scheme 7, 800, may include additional, or alternative steps, without deviating from the scope of the present disclosure. In some examples, Scheme 7, 800, is an alternative synthetic route to Scheme 6, 700. Therefore, the method steps according to Scheme 6, 700, are also applicable to Scheme 7, 800. As illustrated in Scheme 7, 800, the CTA includes $R_{CTA}$ and $Z_{CTA}$ groups, 814, 818, respectively.

Example 8

Figure 13:
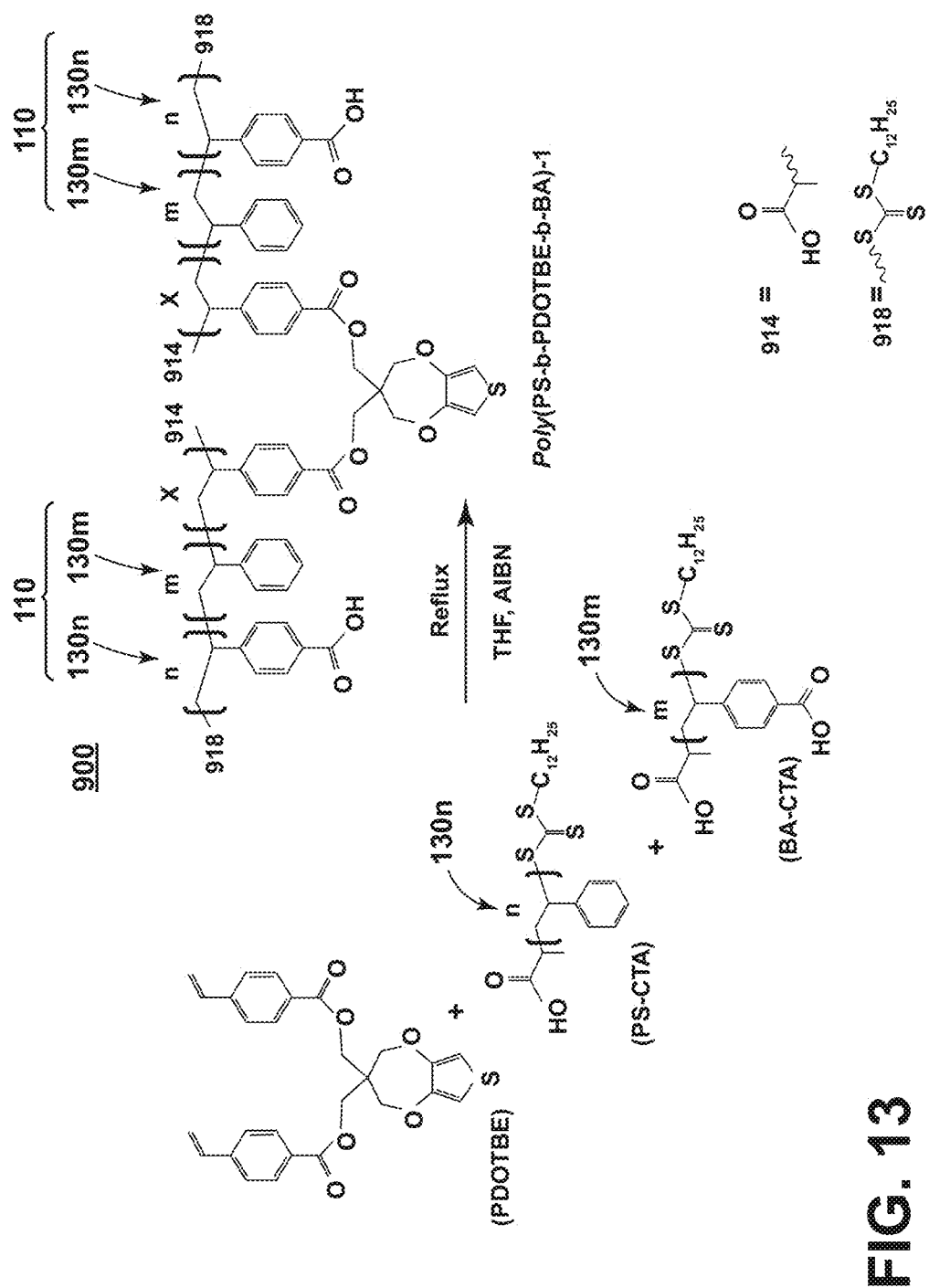
FIG. 13 illustrates an exemplary synthetic scheme according to aspects of the present disclosure.

FIG. 13, pertaining to Example 8 illustrates an exemplary synthetic scheme, 900, for synthesizing a di-block 110 with thiophene linker poly(PS-b-PDOTBE-b-BA)-1. It is understood that the di-block 110 with thiophene linker poly(PS-b-PDOTBE-b-BA)-1 may be synthesized according to other processes. It is also understood that Scheme 8, 900, may include additional, or alternative steps, without deviating from the scope of the present disclosure. As illustrated in Scheme 8, 900, the CTA includes $R_{CTA}$ and $Z_{CTA}$ groups, 914, 918, respectively. Further, "squiggly" lines, as illustrated in the drawings, that denote a connection to another entity may be made, which is a polymer in FIG. 13.

In an initial step, 1.0 gram of PDOTBE, 0.25 grams of poly (BA-CTA), 0.25 grams of poly (PS-CTA), and 0.001 grams of AIBN were dissolved in 50 milliliters of THF. The mixture was heated to reflux and reacted for varying times. Next, the reaction was cooled to room temperature, and the solvent and un-reacted monomer were removed by rotary evaporation and distillation. The solid was precipitated using diethyl ether. The solid was re-dissolved in THF and re-precipitated using diethyl ether to remove unreacted monomers. The final solid was dried under vacuum at 50° C.

Example 9

Figure 14:
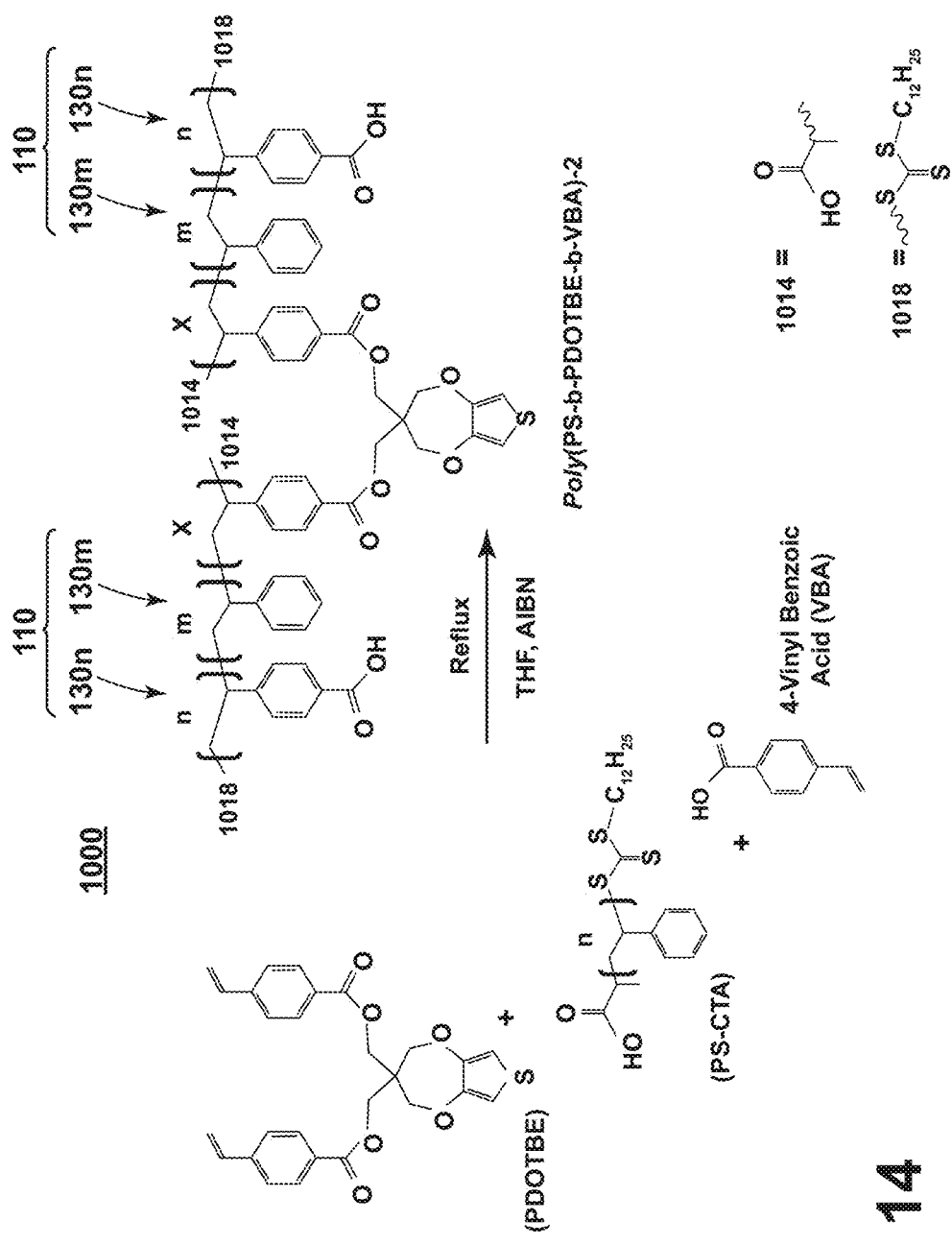
FIG. 14 illustrates an exemplary synthetic scheme according to aspects of the present disclosure.

FIG. 14, pertaining to Example 9, illustrates an exemplary synthetic scheme, 1000, for synthesizing a di-block 110 with thiophene linker poly(PS-b-PDOTBE-b-VBA)-2). It is understood that the di-block 110 with thiophene linker poly(PS-b-PDOTBE-b-VBA)-2) may be synthesized according to other processes. It is also understood that Scheme 9, 1000, may include additional, or alternative, steps without deviating from the scope of the present disclosure. In some examples, Scheme 9, 1000, is an alternative synthetic route to Scheme 8, 900. Therefore, the method steps according to Scheme 8, 900, are also applicable to Scheme 9, 1000. As illustrated in Scheme 9, 1000, the CTA includes $R_{CTA}$ and $Z_{CTA}$ groups, 1014, 1018, respectively.

Example 10

Figure 15:
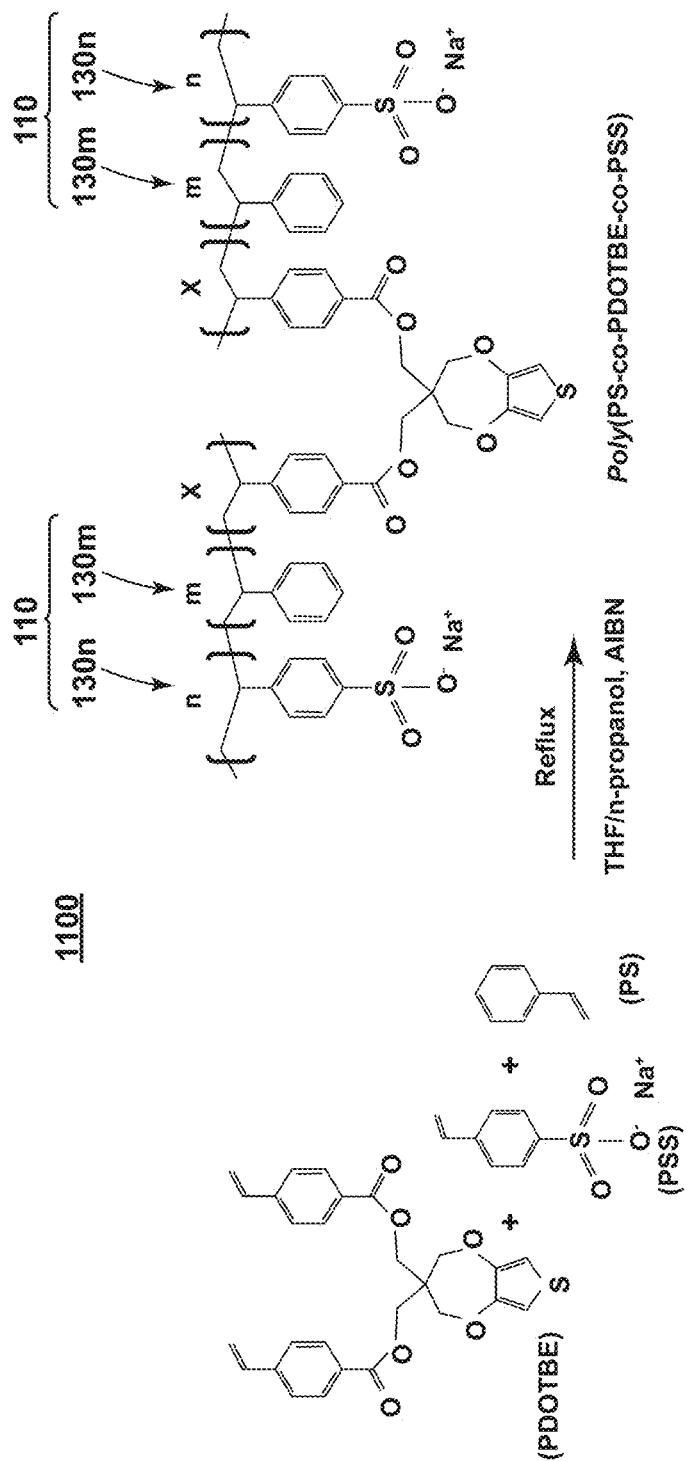
FIG. 15 illustrates an exemplary synthetic scheme according to aspects of the present disclosure.

FIG. 15, pertaining to Example 10, illustrates an exemplary synthetic scheme, 1100, for synthesizing co-polymer poly(PS-co-PDOTBE-co-PSS), which may function as a di-block copolymer 110. It is understood that co-polymer poly(PS-co-PDOTBE-co-PSS) may be synthesized according to other processes. It is also understood that Scheme 10, 1100, may include additional, or alternative, steps without deviating from the scope of the present disclosure. For example, the polymers of the present disclosure (e.g., sulfonate described in the following procedure) may be modified. For example, the polymers may be covalently functionalized with quaternized amine or ammonium cations, which may be primarily attached to a block (e.g., polystyrene block) of the copolymer. Accordingly, blocks of polymer (e.g., 130) may be physically cross-linked (e.g., through weak interactions, such as ionic bonds), but not chemically cross-linked (e.g., covalently bonded) with one another. Optionally, other types of cations, such as pyridinium or imidazolium groups, may be used to modify, or functionalize, the polymer. Further, while illustrated as Nat, a cation counterion of synthetic schemes according to the present disclosure may be any suitable cation, including, but not limited to, $H^+$, $Li^+$, etc. Likewise, an anion counterion of synthetic schemes according to the present disclosure may be any suitable cation.

In an initial step, 1.0 gram of PDOTBE, 0.208 grams of styrene (PS), 0.412 grams of sodium 4-vinylbenzenesulfonate (PSS), and 0.005 grams of AIBN (eq.) were dissolved in 10 milliliters of THF and 20 milliliters of n-propanol. The mixture was heated to reflux and reacted for varying times. Next, the reaction was cooled to room temperature, and the solvent was removed by rotary evaporation. The solid was precipitated using diethyl ether. Then, the solid was re-dissolved in 100 milliliters of ethanol, and re-precipitated using diethyl ether to remove unreacted monomers. The solid was filtered and dried under vacuum at 50° C. In Scheme 10, 1100, 130*n* and 130*m* are different molar equivalents, and X refers to PDOTBE as a linker to other monomer or polymeric units. It is within the scope of the disclosure for the X units to be connected or not connected. In executing Scheme 10, 1100, it was unexpected that the PDOTBE compound was processable in an oxidizable form (e.g., rather than the reduced form).

Example 11

Figure 16:
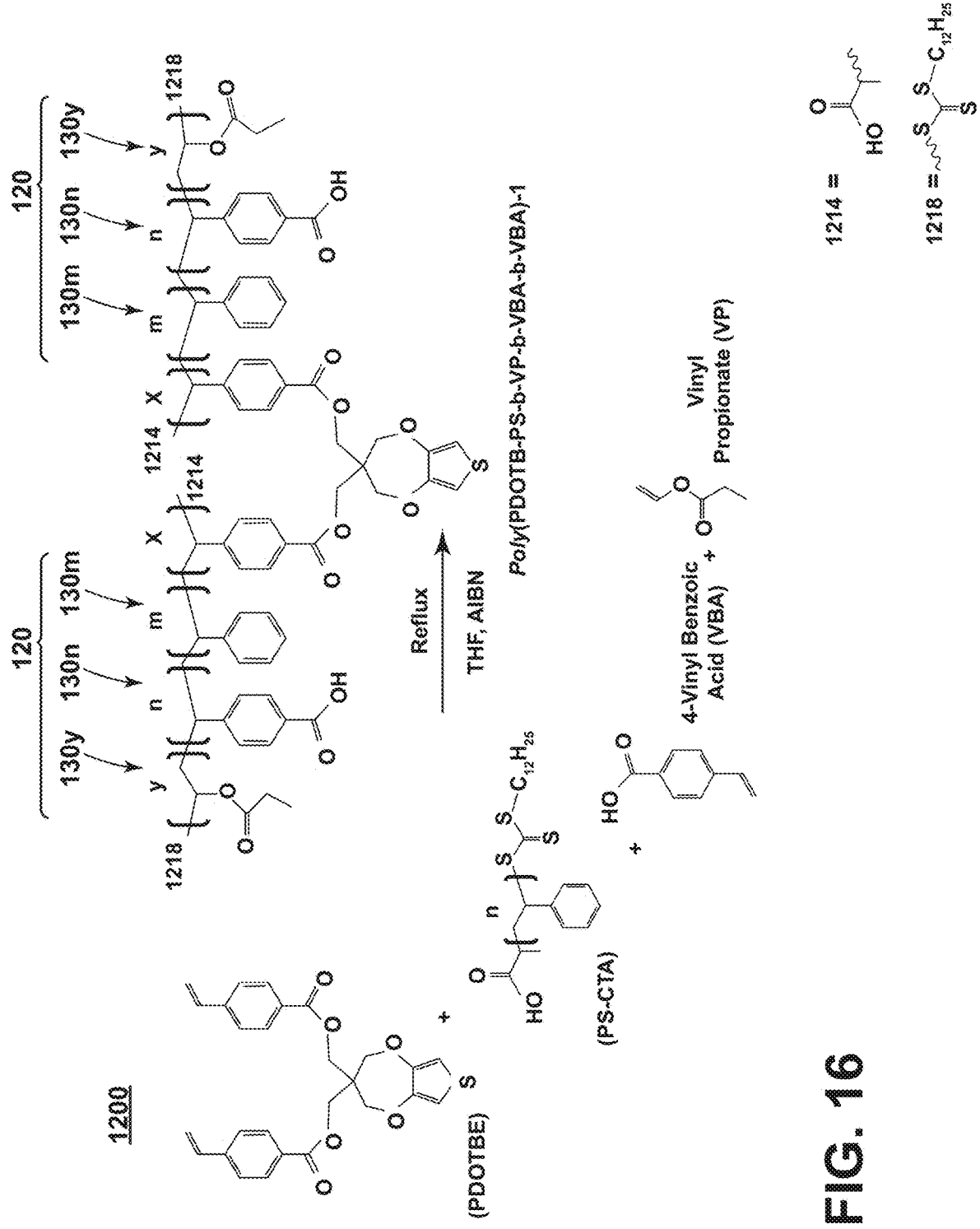
FIG. 16 illustrates an exemplary synthetic scheme according to aspects of the present disclosure.

FIG. 16, pertaining to Example 11, illustrates an exemplary synthetic scheme, 1200, for synthesizing a tri-block 120 with thiophene linker poly(PDOTBE-PS-b-VP-b-VBA)-1. It is understood that the tri-block 120 with thiophene linker poly(PDOTBE-PS-b-VP-b-VBA)-1 may be synthesized according to other processes. It is also understood that Scheme 11, 1200, may include additional, or alternative, steps without deviating from the scope of the present disclosure. As illustrated in Scheme 11, 1200, the CTA includes $R_{CTA}$ and $Z_{CTA}$ groups, 1214, 1218, respectively.

In an initial step, 1.0 gram of PDOTBE, 0.25 grams of poly (PS-CTA), 0.25 grams of 4-vinyl benzoic acid (VBA), 0.1 grams of vinyl propionate (VP), and 0.003 grams of AIBN were dissolved in 50 milliliters of THF. The mixture was heated to reflux and reacted for varying times. Next, the reaction was cooled to room temperature, and the solvent and un-reacted monomer were removed by rotary evaporation and distillation. The solid was precipitated using diethyl ether. The solid was re-dissolved in THF and re-precipitated using diethyl ether to remove unreacted monomers. The final solid was dried under vacuum at 50° C.

Example 12

Figure 17:
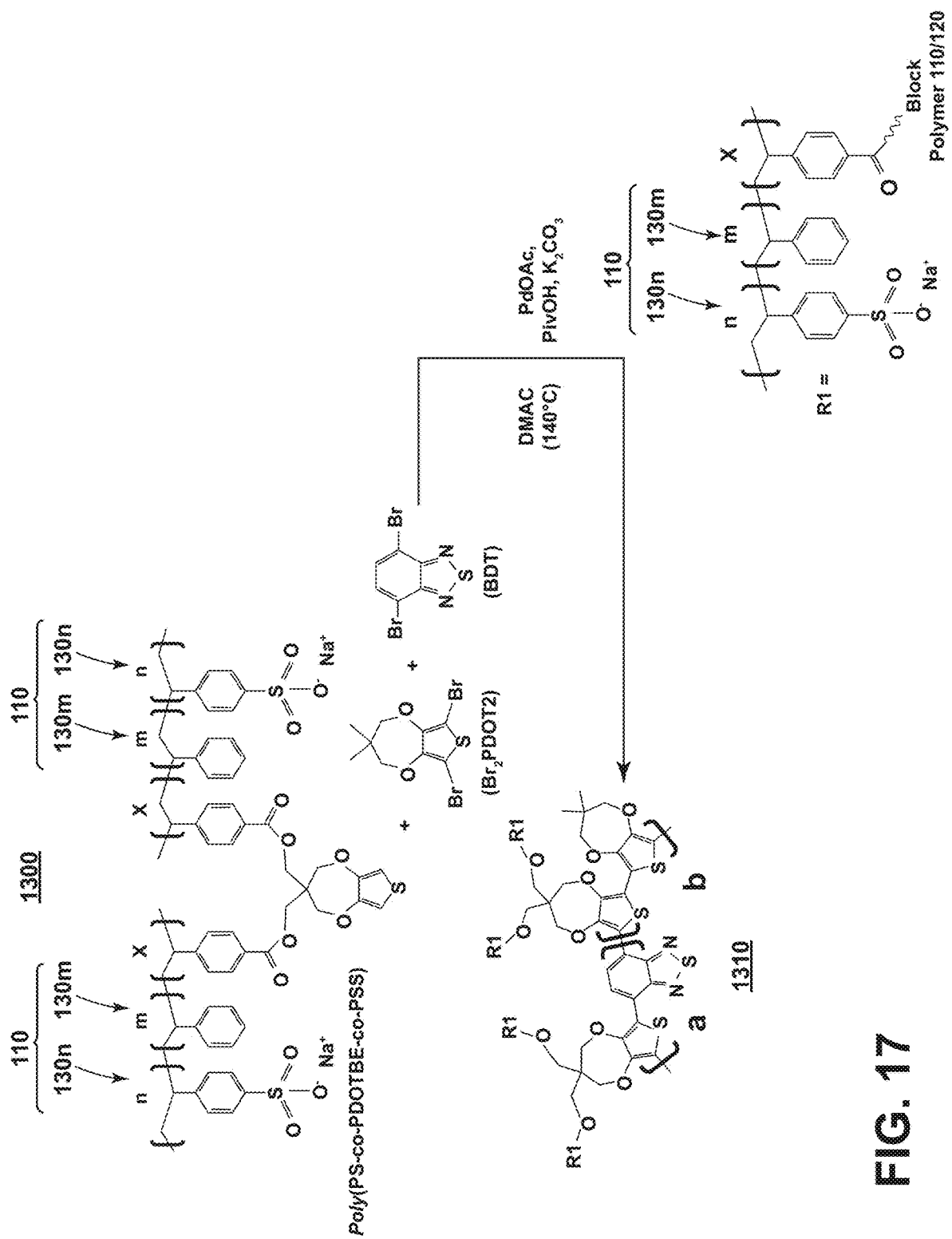
FIG. 17 illustrates an exemplary synthetic scheme according to aspects of the present disclosure.

FIG. 17, pertaining to Example 12, illustrates an exemplary synthetic scheme 1300 for synthesizing a di-block 110 copolymer to conjugated polymer 1310, poly(PS-co-PDOTBE-co-PSS)-graft-poly(Br$_2$PDOT2-co-BDT). It is understood that the di-block 110 copolymer to conjugated polymer 1310, poly(PS-co-PDOTBE-co-PSS)-graft-poly(Br$_2$PDOT2-co-BDT) may be synthesized according to other processes. It is also understood that Scheme 12, 1300, may include additional, or alternative, steps without deviating from the scope of the present disclosure. For example, the "block copolymer, 110/120" denotation indicates molecular structure beyond this point in Scheme 12, 1300, which is applicable to polymers (e.g., conductive polymer 100, etc.) according to the present disclosure. Furthermore, the illustrated "a" and "b" blocks may include different di-block/tri-block attachments 110/120 on the thiophene. For example, the illustrated "b" block may include groups not including the illustrated R1.

In an initial step, 1.04 grams of poly(PS-co-PDOTBE-co-PSS), 0.691 grams of Br$_2$PDOT2 (a donor compound), 0.1178 grams of Br$_2$-BDT (an acceptor compound), 0.8559 grams of potassium carbonate, 0.076 grams of pivalic acid, and 0.0100 grams of palladium acetate, were dissolved in 80 milliliters of N,N Dimethylacetamide. The solution was degassed with vacuum pump/N$_2$ purge cycles three times using a Schlenk line. The reaction was performed for varying times. Next, the reaction was cooled to room temperature followed by the addition of methanol to precipitate the polymer. The polymer was washed multiple times with methanol, hexane, and acetone to remove impurities. The polymer was then re-dissolved in N,N-Dimethylacetamide and re-precipitated in methanol. Then, the polymer was washed again with methanol and hexane. The final polymer was dried at 75° C. overnight under vacuum.

Example 13

Figure 18:
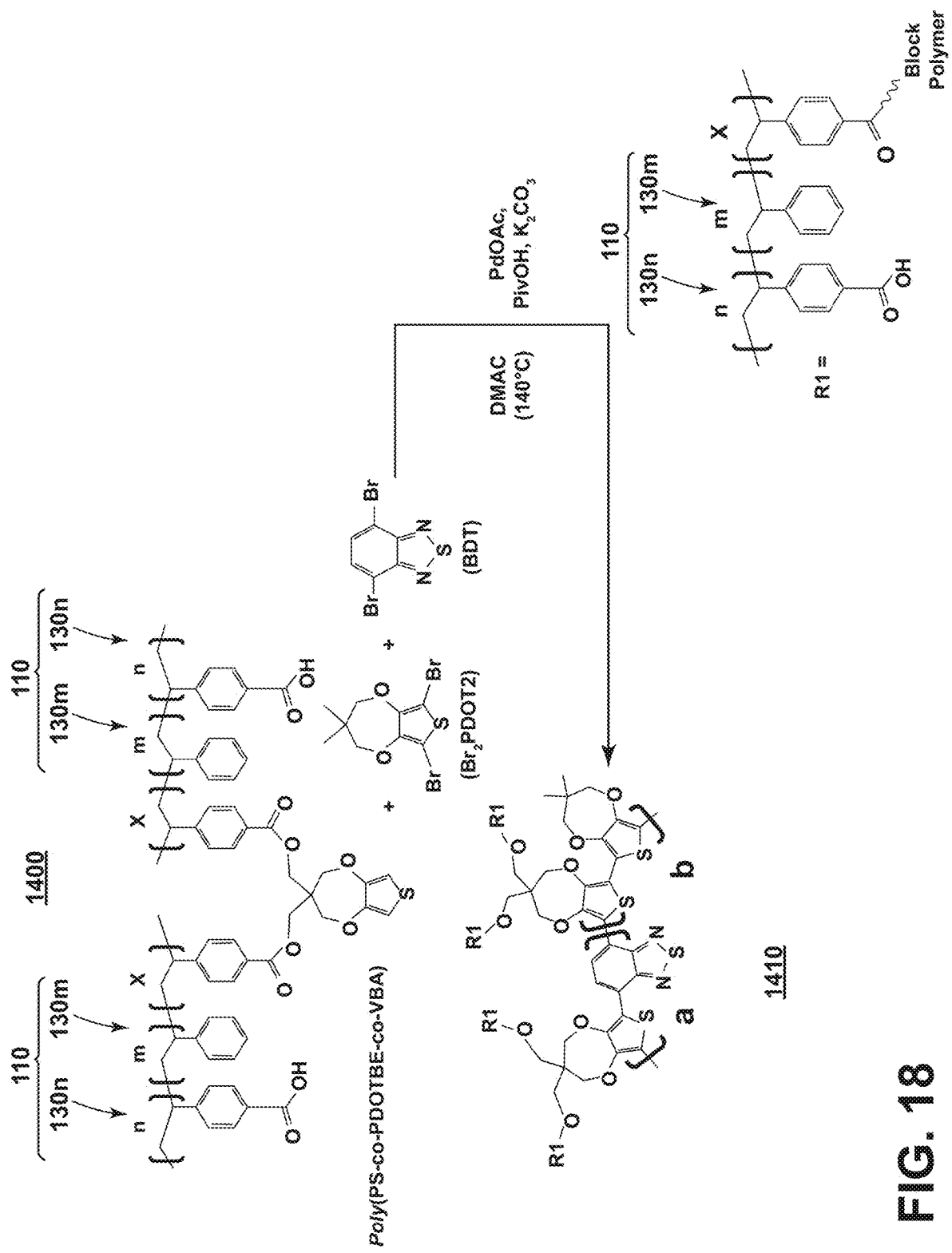
FIG. 18 illustrates an exemplary synthetic scheme according to aspects of the present disclosure.

FIG. 18, pertaining to Example 13, illustrates an exemplary synthetic scheme, 1400, for synthesizing a di-block 110 copolymer to conjugated polymer 1410, poly(PS-co-PDOTBE-co-VBA)-2-graft-poly(Br$_2$PDOT2-co-BDT). It is understood that the di-block 110 copolymer to conjugated polymer 1410, poly(PS-co-PDOTBE-co-VBA)-2-graft-poly(Br$_2$PDOT2-co-BDT) may be synthesized according to other processes. It is also understood that Scheme 13, 1400, may include additional, or alternative, steps without deviating from the scope of the present disclosure.

In an initial step, 2.04 grams of poly(PS-co-PDOTBE-co-VBA)-2, 0.691 grams of Br$_2$PDOT2, 0.1178 grams of BDT, 0.8559 grams of potassium carbonate, 0.076 grams of pivalic acid, and 0.0300 grams of palladium acetate were dissolved in 80 milliliters of N,N Dimethylacetamide. The solution was degassed with vacuum pump/N$_2$ purge cycles three times using a Schlenk line. The reaction was performed for varying times. Next, the reaction was cooled to room temperature followed by the addition of methanol to precipitate the polymer. The polymer was washed multiple times with methanol, hexane, and acetone to remove impurities. The polymer was then re-dissolved in N,N-Dimethylacetamide and re-precipitated in methanol. Then, the polymer was washed again with methanol and hexane. The final polymer was dried at 75° C. overnight under vacuum.

Figure 19:
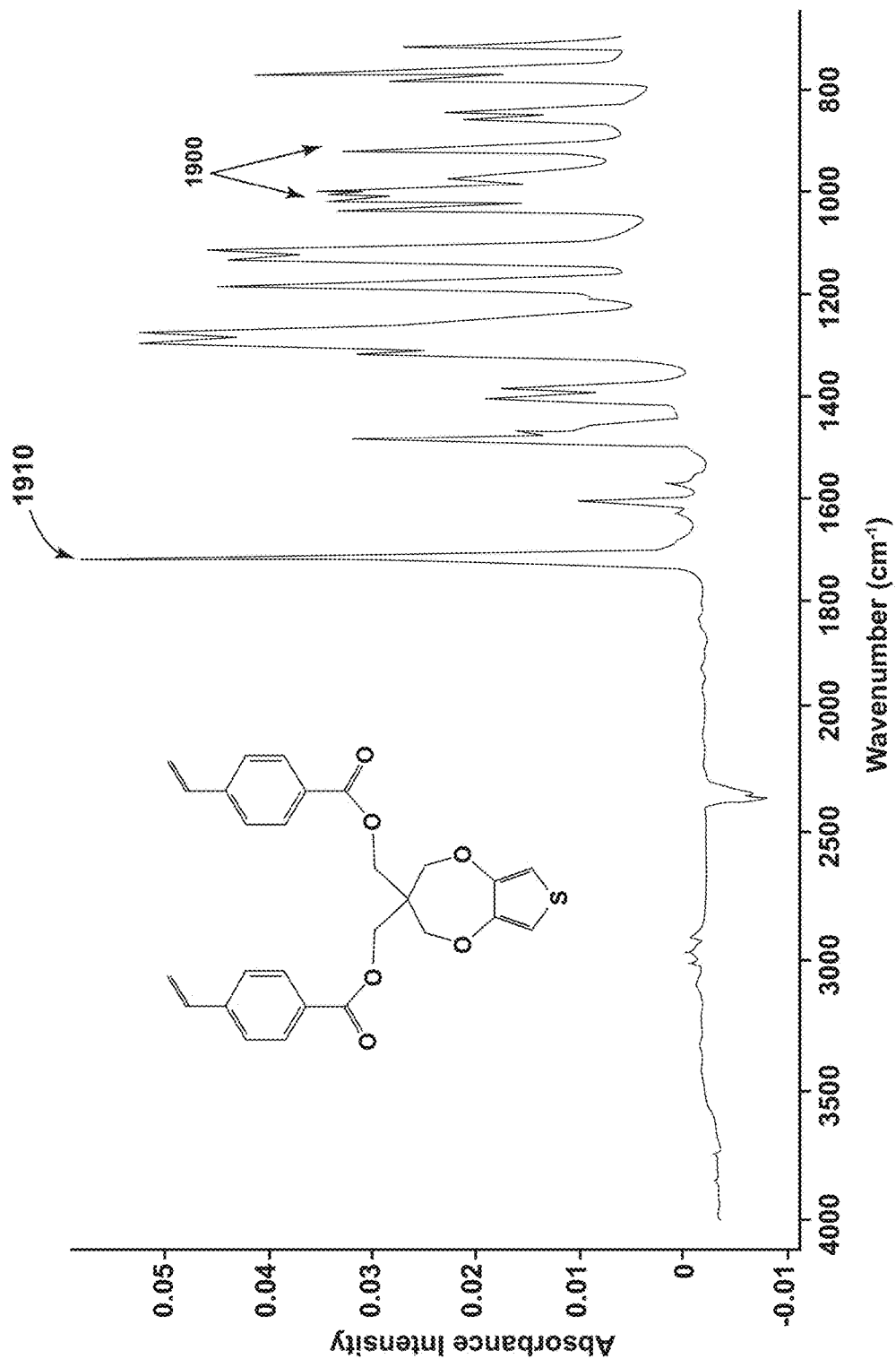
FIG. 19 is an infrared spectroscopy plot of absorbance intensity as a function of a wavenumber for a monomer utilized to generate a block copolymer according to an aspect of the present disclosure.

FIG. 19 is an infrared spectroscopy plot of absorbance intensity as a function of a wavenumber for a PDOTBE according to an aspect of the present disclosure. Specifically, FIG. 19 illustrates the results of infrared spectroscopy of a PDOTBE sample highlighting un-reacted vinyl groups, which are suitable for further reaction into block copolymers. As illustrated in the plot, vinyl peaks, 1900, are present at approximately 915 cm$^{-1}$ and 1990 cm$^{-1}$. A carbonyl ester peak, 1910, is present at approximately 1710 cm$^{-1}$ and ether/ester peaks are present at approximately 1100-1300 cm$^{-1}$.

Figure 20:
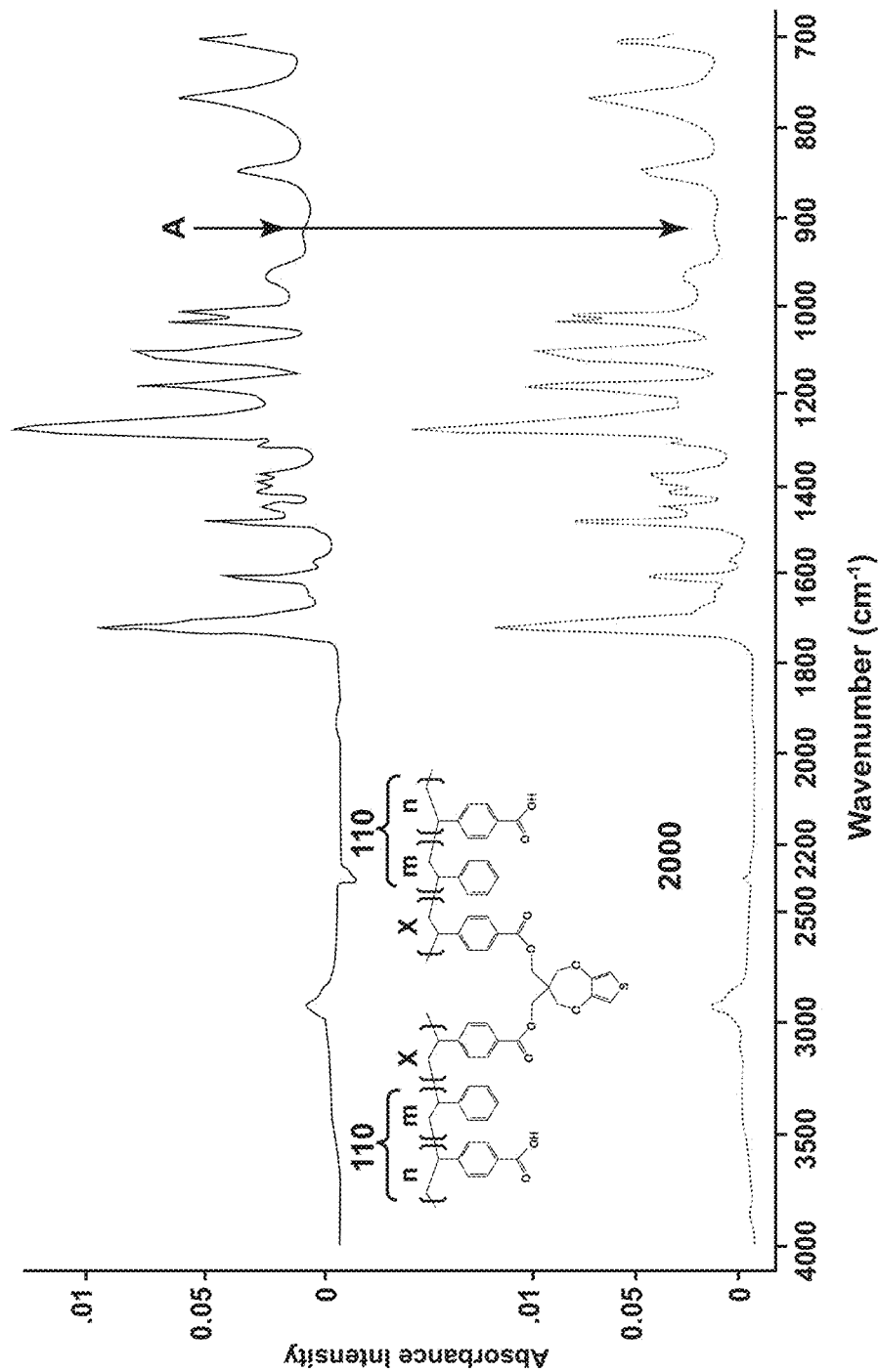
FIG. 20 is an infrared spectroscopy plot of absorbance intensity as a function of a wavenumber for an exemplary di-block copolymer according to an aspect of the present disclosure.

FIG. 20 is an infrared spectroscopy plot of absorbance intensity as a function of a wavenumber for an exemplary di-block 110 copolymer (e.g., polymer 100) 2000 according to an aspect of the present disclosure. Specifically, FIG. 20 illustrates the infrared spectroscopy results of two different poly(PS-co-PDOTBE-co-VBA) di-block 110 copolymer samples highlighting the different blocks in the copolymer. As illustrated in the plot, vinyl peaks were not found to be present at approximately 915 cm 1 or 1990 cm 1 indicating they were completely reacted (see arrows, A). Furthermore, styrene blocks are present at approximately 690 cm 1 and 750 cm 1. A strong hydroxyl stretch is present, which indicates the VBA block, 2000, is present.

Figures 21A, 21B:
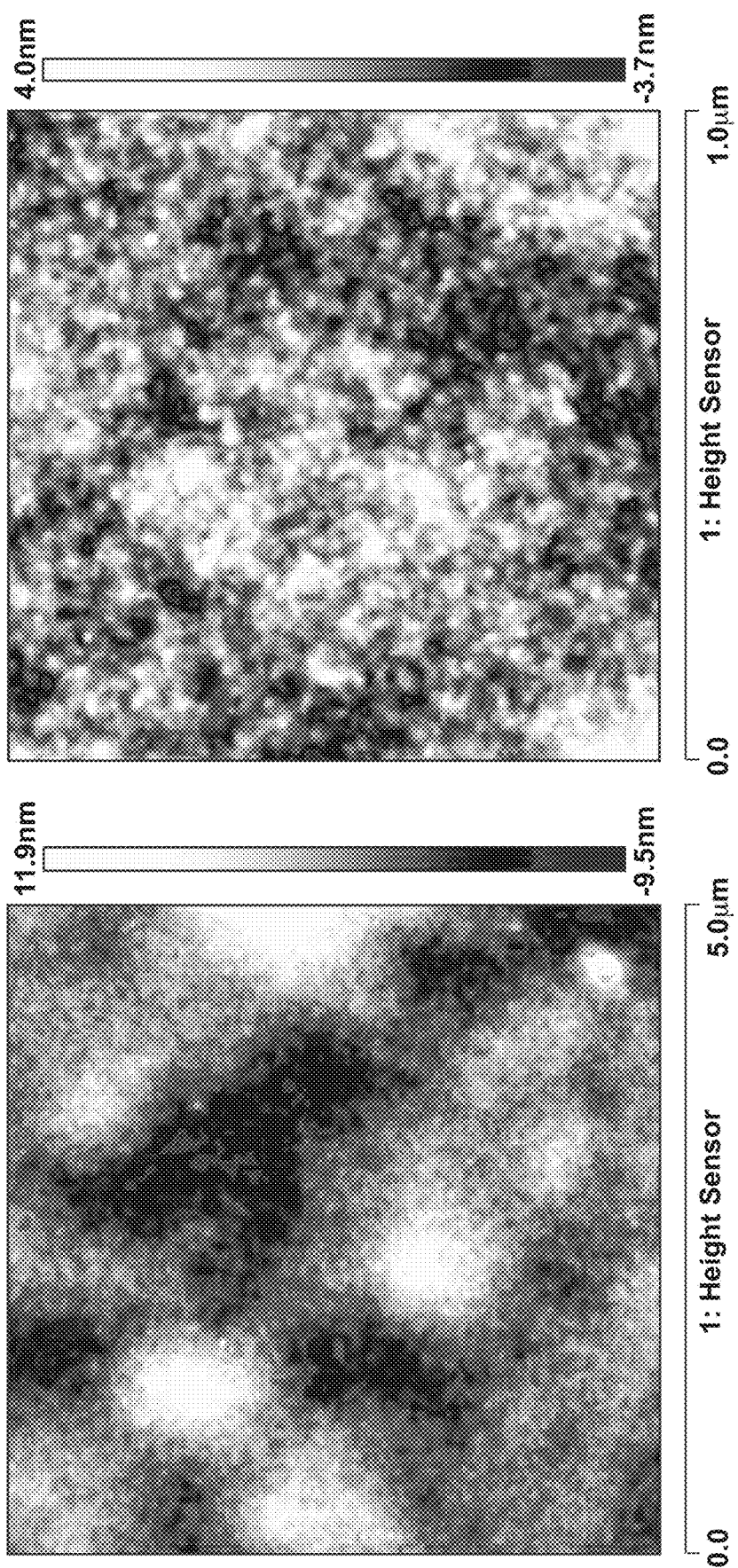
FIG. 21A is an image illustrating a morphology of a polymer according to an aspect of the present disclosure.
FIG. 21B is an image illustrating the morphology of the polymer of FIG. 21A according to an aspect of the present disclosure.

FIGS. 21A and 21B are images at two different scales illustrating a morphology of the polymer synthesized according to Scheme 13, 1400, according to aspects of the present disclosure. Specifically, FIGS. 21A and 21B illustrate morphology for poly(PS-co-PDOTBE-co-VBA)-graft-poly($Br_2$PDOT2-co-BDT) using atomic force microscopy (AFM). As shown, the microphase separation indicates a uniform bi-continuous morphology derived from the different blocks of the polymer and low surface roughness.

Figure 22A:
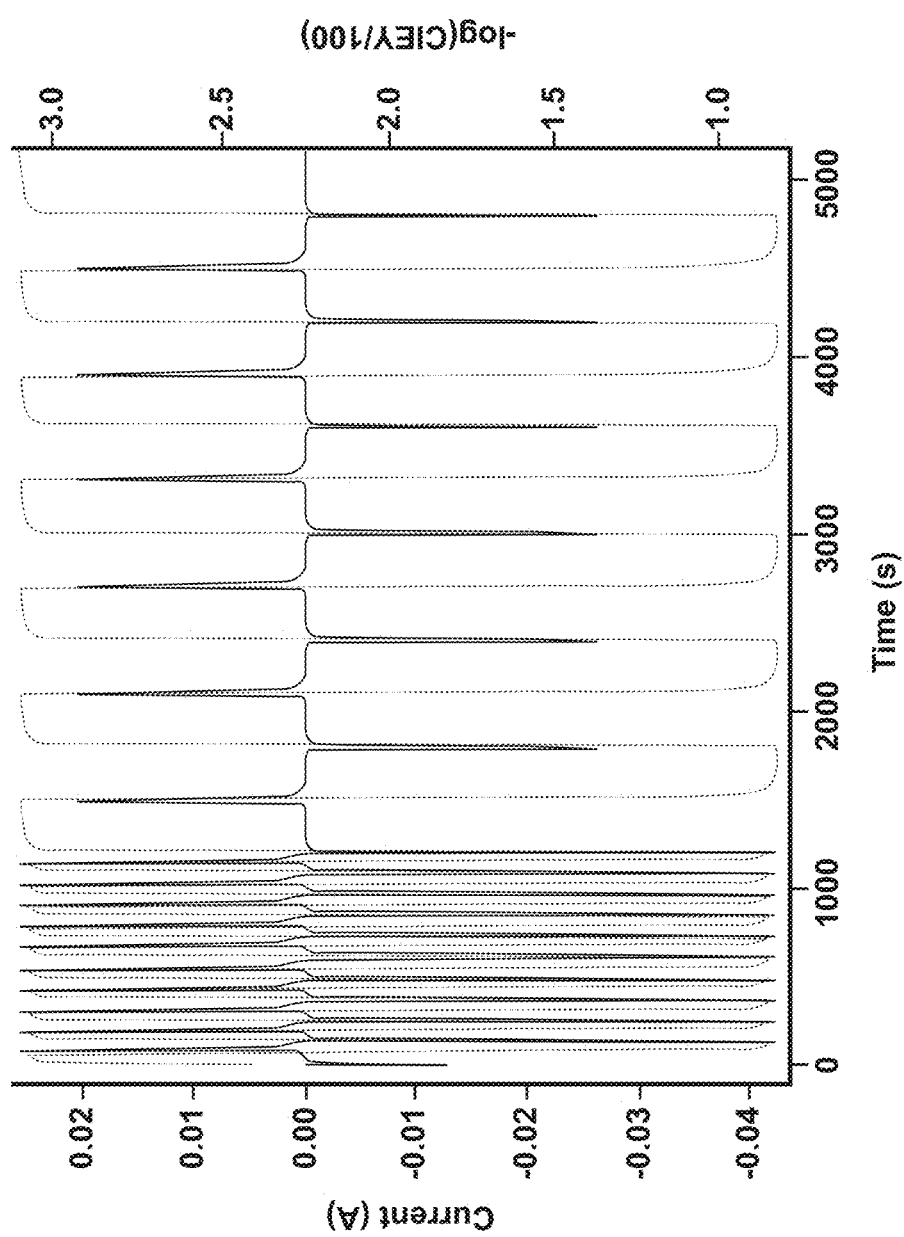
FIG. 22A is a plot of electric current (left axis) and absorbance (right axis) as a function of time for an exemplary electrochromic device that includes the polymer of FIG. 21A according to an aspect of the present disclosure.
Figure 22B:
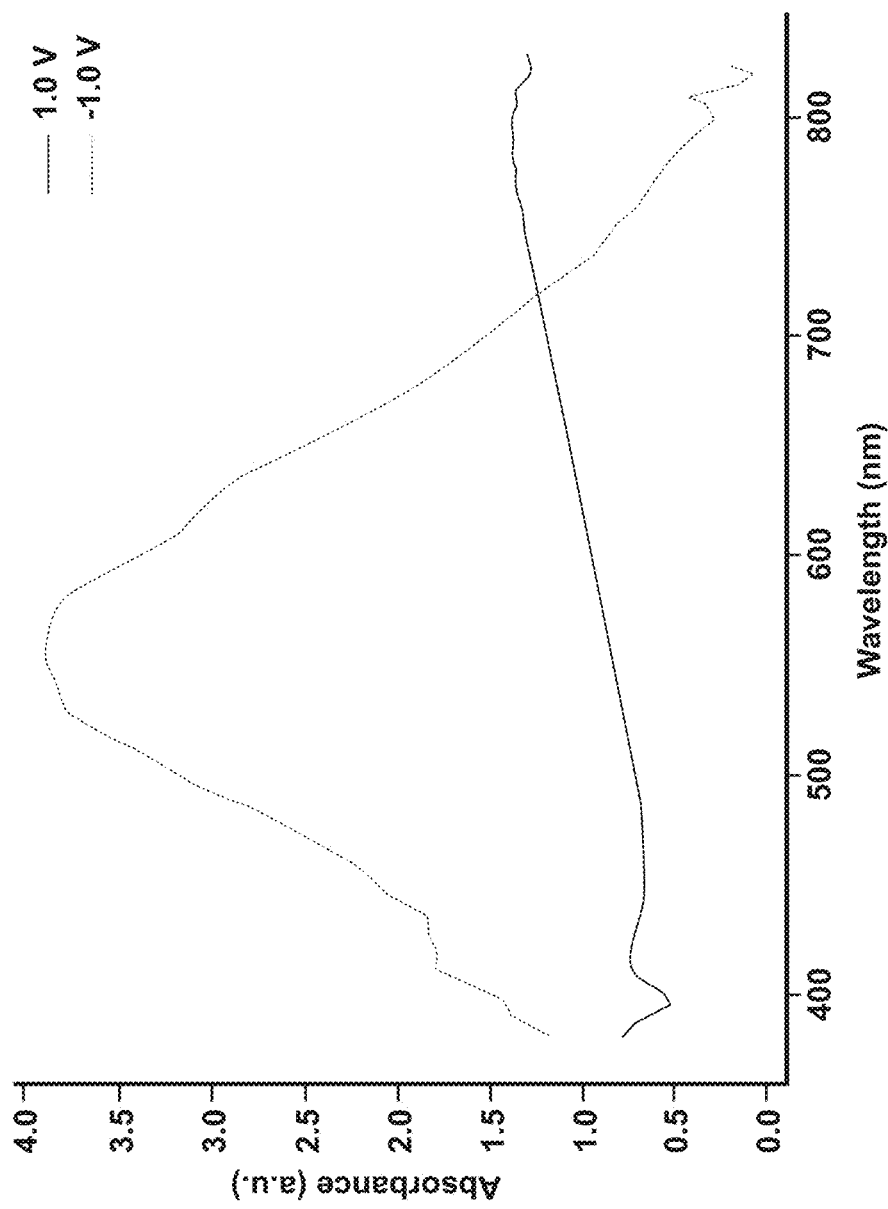
FIG. 22B is a plot of absorbance as a function of a wavelength for the exemplary electrochromic device of FIG. 22A according to an aspect of the present disclosure.

FIG. 22A is a plot of electric current (left axis) and –log (CIEY/100) (right axis) as a function of time for an exemplary electrochromic device 14 including the poly(PS-b-PDOTBE-b-VBA)-2-graft-poly($Br_2$PDOT2-co-BDT) copolymer as a conductive polymer 100 according to an aspect of the present disclosure. FIG. 22A illustrates a current response for +/−1.0 V switching potential (left axis). The corresponding absorbance with respect to CIEY is illustrated on the right axis. The response indicates fast switching times, which include switching times of less than 25 seconds from a fully dark state to a fully clear state (e.g., the second and first states, respectively). FIG. 22B is a plot of absorbance at two different voltages (e.g. +/−1.0 V), which represent first and second states of the electrochromic device, as a function of wavelength, according to an aspect of the present disclosure. FIG. 22B illustrates a specific absorbance across UV-Visible wavelengths for two different states/conditions (+/−1.0V). The states may be considered "bi-stable states" that can remain dark or clear at open circuit (e.g., exhibiting memory). States in between these potentials may also be maintained, as well as outside of the +/−1.0 V range.

Construction of the exemplary electro-optic device 14 of FIGS. 22A and 22B includes a cathodic layer (e.g., cathodic film 74) containing poly(PS-b-PDOTBE-b-VBA)-2-graft-poly($Br_2$PDOT2-co-BDT), which was prepared in various solvents having concentrations in a range of 0.5-6 wt. %. The electro-optic device 14 also contains an electrolyte layer (e.g., electrolyte layer 84) including a poly(methyl methacrylate) polymer and a salt (e.g., lithium triflate, lithium perchlorate, sodium triflate, sodium perchlorate, etc.), and an anodic layer (e.g., anodic film 78) including a vanadium-titanium oxide ($VTiO_x$) layer. However, other exemplary electro-optic devices 14 having the polymer of FIG. 22A were constructed having other anodics, such as a TPA. It is within the scope of the disclosure for the cathodic, anodic, or electrolyte layers to be sputtered, coated from a sol-gel material, or applied with any other suitable technique. In specific examples, the cathodic layer is deposited on a transparent conductive oxide (TCO) layer, such as indium-tin oxide, and the anodic layer, the $VTiO_x$ layer, is deposited on another TCO layer. The electrolyte layer is positioned between the cathodic and anodic layers.

It will be understood that any described processes or steps within described processes may be combined with other disclosed processes or steps to form structures within the scope of the present device. Likewise, it will be understood that any described compounds (e.g., blocks, donors, acceptors, R groups, side chain modifications, etc.) may be combined with other disclosed compounds to form structures. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. An electro-optic element, comprising:
   a first substrate defining first and second surfaces, wherein a first electrically conductive layer is disposed on the second surface;
   a second substrate defining third and fourth surfaces, wherein a second electrically conductive layer is disposed on the third surface; and
   a medium disposed between the second and third surfaces, comprising:
      a first block copolymer unit comprising:
         at least one selected from the group of a first di-block copolymer and first tri-block copolymer; and
         at least one of a donor compound or an acceptor compound conjugated with the at least one of the first di-block copolymer and first tri-block copolymer, thereby forming the first block copolymer unit; and
      a second block copolymer unit comprising:
         at least one selected from the group of a second di-block copolymer and second tri-block copolymer; and
   wherein the first block copolymer unit is polymerized with the second block copolymer unit.

2. The electro-optic element of claim 1, wherein the at least one of the donor compound and the acceptor compound is electrochromic.

3. The electro-optic element of claim 1, wherein the medium is in a form of a cathodic film, an anodic film, or an electrochromic film.

4. The electro-optic element of claim 1, wherein the at least one of the first di-block copolymer and the first tri-block copolymer include a side-chain modification, which imparts at least one of an increased processability, adhesion or advantageous morphology characteristic to the medium.

5. The electro-optic element of claim 1, wherein the at least one of the first di-block copolymer and the first tri-block copolymer include a side-chain modification producing the effect of UV-visible absorbance in a dark state of the electro-optic element.

6. The medium for an electro-optic element of claim 1, wherein the at least one of the first di-block copolymer and first tri-block copolymer comprise:
   a first block and a second block, wherein the first block and the second block are physically cross-linked.

7. The medium for an electro-optic element of claim 1, wherein the at least one of the first di-block copolymer and first tri-block copolymer comprise:

a first block and a second block, wherein the first block and the second block are chemically cross-linked.

8. The medium for an electro-optic element of claim 1, wherein a chemical compound of Formula (I) links the first block copolymer unit and the second block copolymer unit:

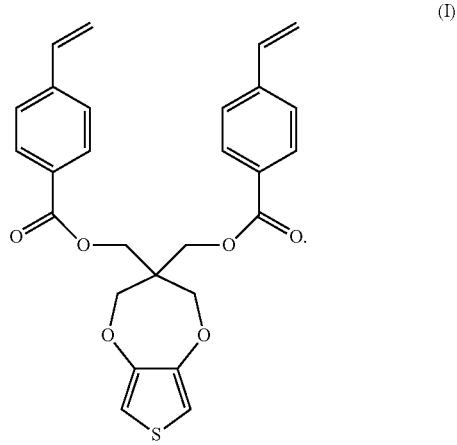 [SMILES: C=Cc1ccc(C(=O)OCC2(COC(=O)c3ccc(C=C)cc3)COc3cscc3OC2)cc1]

(I)

9. An electro-optic element, comprising:
a first substrate defining first and second surfaces, wherein a first electrically conductive layer is disposed on the second surface;
a second substrate defining third and fourth surfaces, wherein a second electrically conductive layer is disposed on the third surface; and
a medium disposed between the second and third surfaces, comprising:
a first di-block copolymer unit comprising:
a first di-block copolymer; and
at least one of a donor compound or an acceptor compound conjugated with the first di-block copolymer, thereby forming the first di-block copolymer unit; and
a second di-block copolymer unit comprising:
a second di-block copolymer conjugated with the at least one of the donor compound and the acceptor compound, thereby linking the first di-block copolymer unit with the second di-block copolymer unit.

10. The electro-optic element of claim 9, wherein the at least one of the donor compound and the acceptor compound is electrochromic.

11. The electro-optic element of claim 9, wherein the first di-block copolymer unit includes a donor compound and an acceptor compound.

12. The electro-optic element of claim 9, wherein the at least one of the donor compound and the acceptor compound is one of a dioxythiophene or a tri-phenyl amine.

13. The electro-optic element of claim 9, wherein the medium is in a form of a cathodic film, an anodic film, or an electrochromic film.

14. The electro-optic element of claim 9, wherein the first di-block copolymer includes a side-chain modification, which imparts at least one of an increased processability, adhesion or advantageous morphology characteristic to the medium.

15. An electro-optic element, comprising:
a first substrate defining first and second surfaces, wherein a first electrically conductive layer is disposed on the second surface;
a second substrate defining third and fourth surfaces, wherein a second electrically conductive layer is disposed on the third surface; and
a medium disposed between the second and third surfaces, comprising:
a first tri-block copolymer unit comprising:
a first tri-block copolymer; and
at least one of a donor compound or an acceptor compound conjugated with the first tri-block copolymer, thereby forming the first tri-block copolymer unit; and
a second tri-block copolymer unit comprising:
a second tri-block copolymer conjugated with the at least one of the donor compound and the acceptor compound, thereby linking the first tri-block copolymer unit with the second tri-block copolymer unit.

16. The electro-optic element of claim 15, wherein the at least one of the donor compound and the acceptor compound is electrochromic.

17. The electro-optic element of claim 15, wherein the first tri-block copolymer unit includes a donor compound and an acceptor compound.

18. The electro-optic element of claim 15, wherein the at least one of the donor compound and the acceptor compound is one of a dioxythiophene or a tri-phenyl amine.

19. The electro-optic element of claim 15, wherein the medium is in a form of a cathodic film, an anodic film, or an electrochromic film.

20. The electro-optic element of claim 15, wherein the first tri-block copolymer includes a side-chain modification, which imparts at least one of an increased processability, adhesion or advantageous morphology characteristic to the medium.

* * * * *